(12) United States Patent
Kitamura et al.

(10) Patent No.: US 9,314,835 B2
(45) Date of Patent: Apr. 19, 2016

(54) POWER STEERING APPARATUS AND METHOD OF MANUFACTURING POWER STEERING APPARATUS

(71) Applicant: HITACHI AUTOMOTIVE SYSTEMS STEERING, LTD., Hiki-gun, Saitama (JP)

(72) Inventors: Keisuke Kitamura, Atsugi (JP); Satoru Muto, Novi (JP); Tatsuyoshi Maruyama, Atsugi (JP)

(73) Assignee: HITACHI AUTOMOTIVE SYSTEMS STEERING, LTD., Hiki-Gun (JP)

( * ) Notice: Subject to any disclaimer, the term of this patent is extended or adjusted under 35 U.S.C. 154(b) by 0 days.

(21) Appl. No.: 14/472,988

(22) Filed: Aug. 29, 2014

(65) Prior Publication Data
US 2015/0060188 A1    Mar. 5, 2015

(30) Foreign Application Priority Data

Sep. 3, 2013   (JP) .................................. 2013-181812

(51) Int. Cl.
*B62D 5/04*   (2006.01)
*B21K 1/64*   (2006.01)
*F16H 25/22*   (2006.01)
*F16H 25/24*   (2006.01)

(52) U.S. Cl.
CPC ................. *B21K 1/64* (2013.01); *B62D 5/0448* (2013.01); *F16H 25/2204* (2013.01); *F16H 25/24* (2013.01)

(58) Field of Classification Search
CPC ................................ B21K 1/64; B62D 5/0448
USPC ............................................ 180/444, 446, 443
See application file for complete search history.

(56) References Cited

U.S. PATENT DOCUMENTS

| | | | |
|---|---|---|---|
| 2007/0204711 A1 | 9/2007 | Budaker et al. | |
| 2010/0314192 A1* | 12/2010 | Nagase et al. | 180/444 |
| 2011/0000737 A1* | 1/2011 | Nagase et al. | 180/444 |
| 2013/0220047 A1* | 8/2013 | Yokoyama et al. | 74/424.87 |

FOREIGN PATENT DOCUMENTS

JP    2008-509353 A    3/2008

* cited by examiner

*Primary Examiner* — Anne Marie Boehler
*Assistant Examiner* — Marlon Arce
(74) *Attorney, Agent, or Firm* — Foley & Lardner LLP

(57) ABSTRACT

A nut is formed by a die forging process in which a die used for the die forging process is released in a direction along the direction of the axis of rotation of the nut.

18 Claims, 12 Drawing Sheets

B-B

A-A

POWER STEERING APPARATUS AND METHOD OF MANUFACTURING POWER STEERING APPARATUS

BACKGROUND OF THE INVENTION

The present invention relates to a power steering apparatus and a method of manufacturing a power steering apparatus.

A technique relating to power steering apparatus is disclosed in Japanese Unexamined Patent Application Publication (Translation of PCT Application) No. 2008-509353. The JP Publication discloses a ball bearing helical gear mechanism transmitting an output from an electric motor to a spindle.

According to the technique disclosed in the above-described JP Publication No. 2008-509353, a nut of the ball bearing helical gear mechanism has projections and recesses on the outer periphery thereof. Accordingly, to form the nut by die forging, a die used for the die forging process has to be released in the radial direction of the nut because of the presence of the projections and recesses, and it is necessary to form the hollow portion of the nut by cutting, resulting in a reduction in the yield.

SUMMARY OF INVENTION

The present invention has been made in view of the above-described issue. Accordingly, an object of the present invention is to provide a power steering apparatus and a power steering apparatus manufacturing method, which are capable of improving manufacturability.

To attain the above-described object, the present invention provides a power steering apparatus and a power steering apparatus manufacturing method, in which the nut is formed by a die forging process in which a die used for the die forging process is released in a direction along the direction of the axis of rotation of the nut.

DESCRIPTION OF EMBODIMENTS

[First Embodiment]

A power steering apparatus 1 according to a first embodiment of the present invention will be explained below. The power steering apparatus 1 of the first embodiment imparts assist force to the steering force of the driver by transmitting driving force from an electric motor 40 to a wheel turning shaft 10 through a screw mechanism 26.

[Structure of Power Steering Apparatus]

Figure 1:
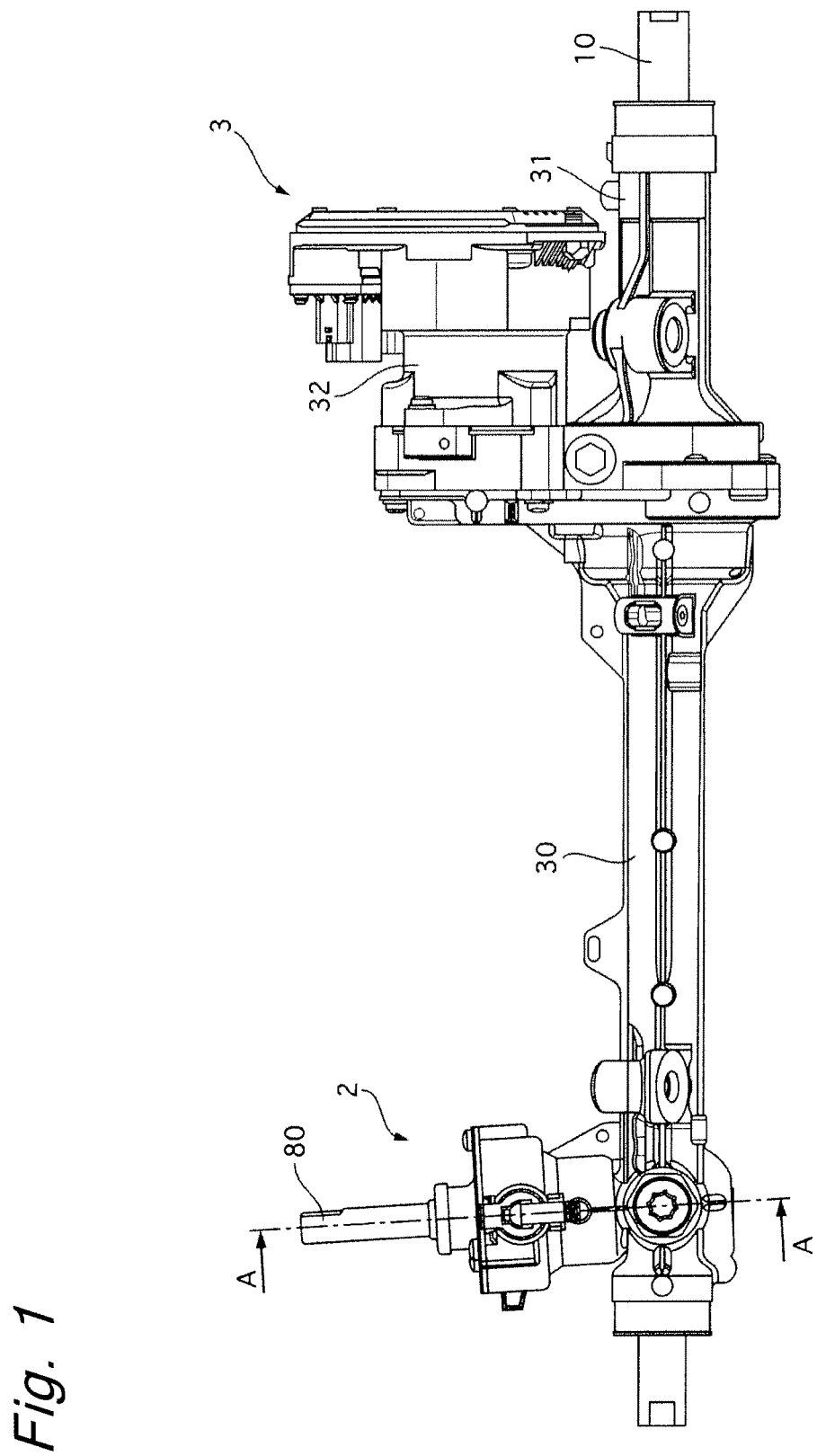
FIG. 1 is a front view of a power steering apparatus according to a first embodiment of the present invention.
Figure 2:
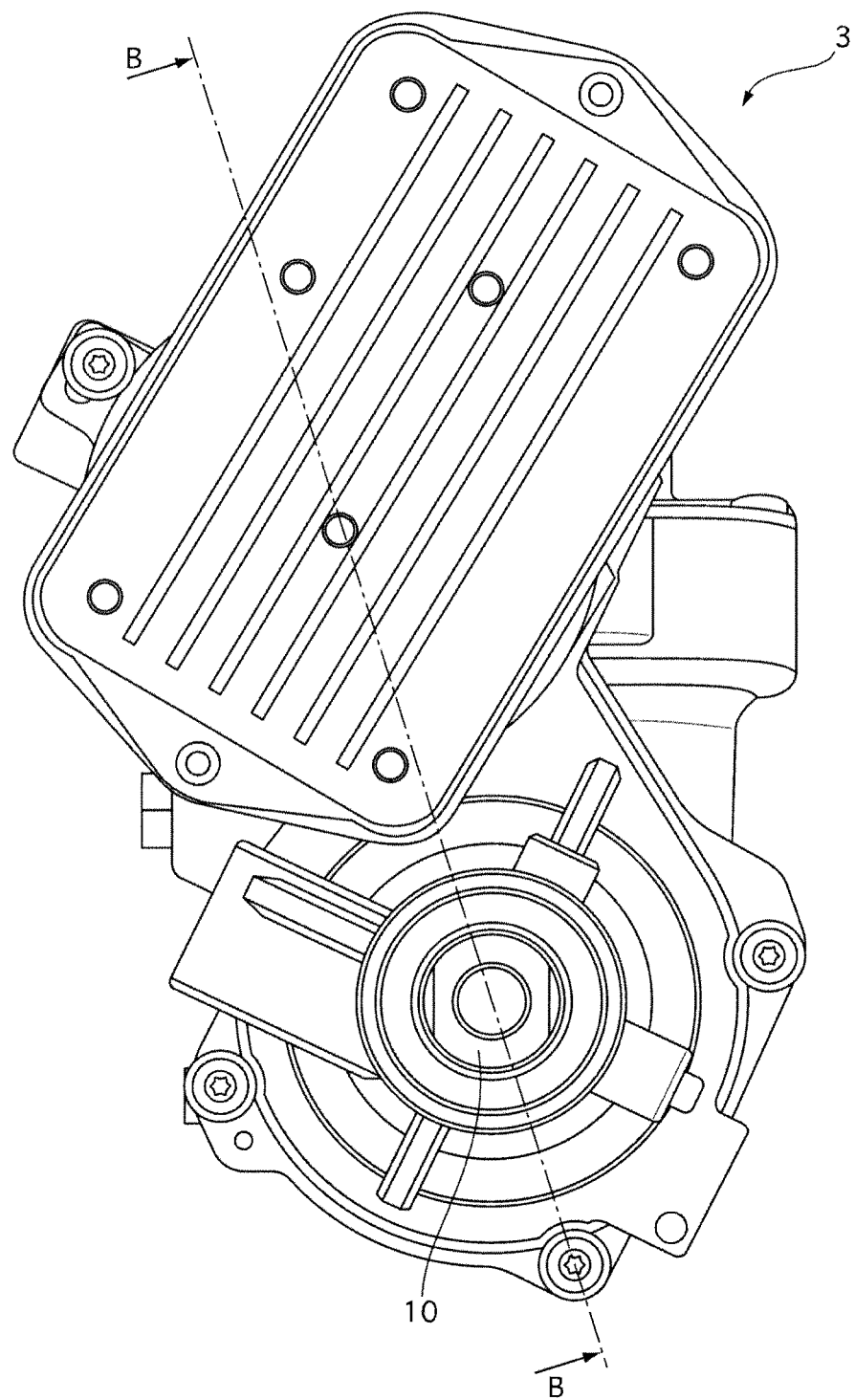
FIG. 2 is an axial view of the power steering apparatus according to the first embodiment, as viewed from the axial direction of the apparatus.
Figure 3:
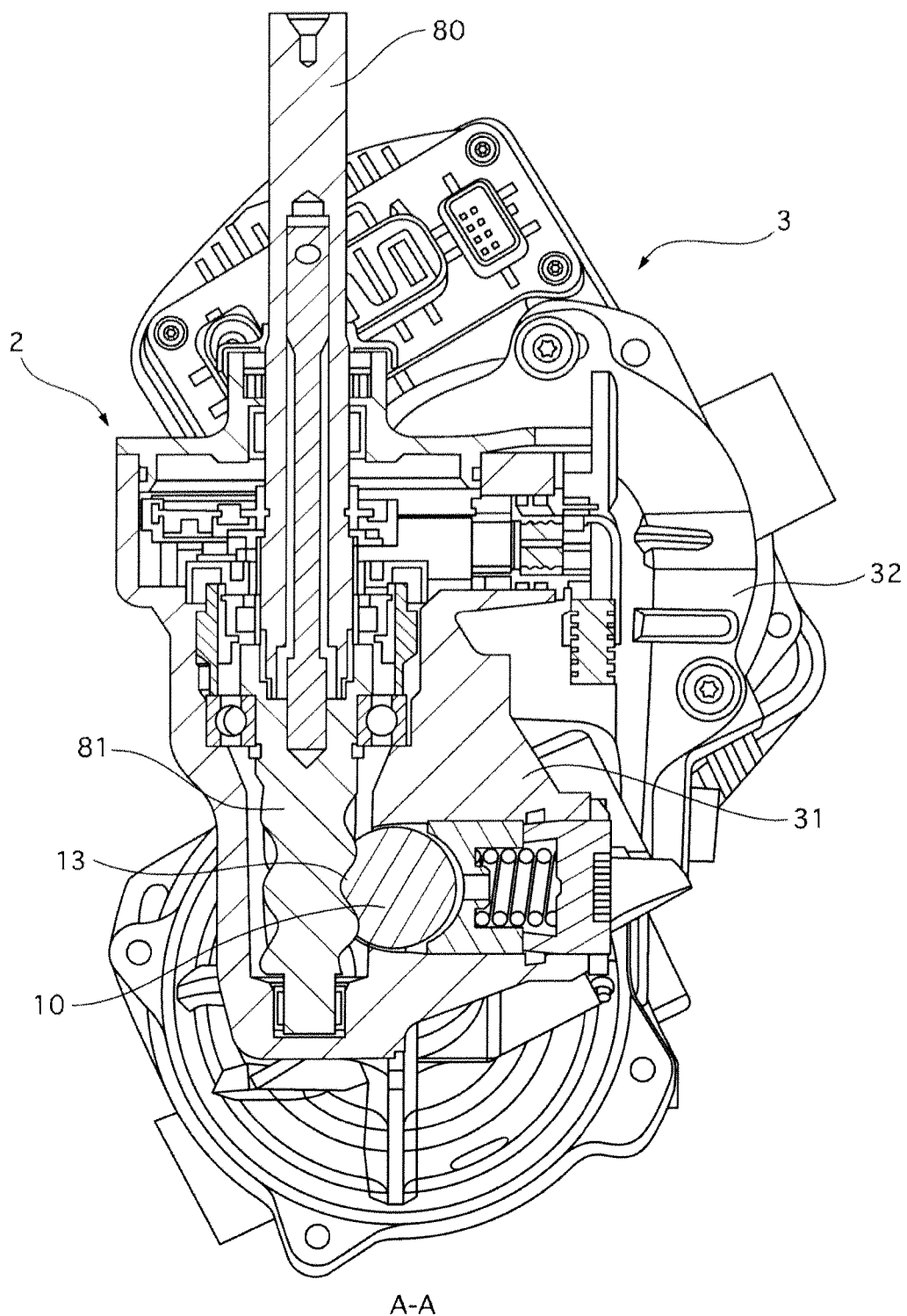
FIG. 3 is a sectional view of the power steering apparatus according to the first embodiment.
Figure 4:
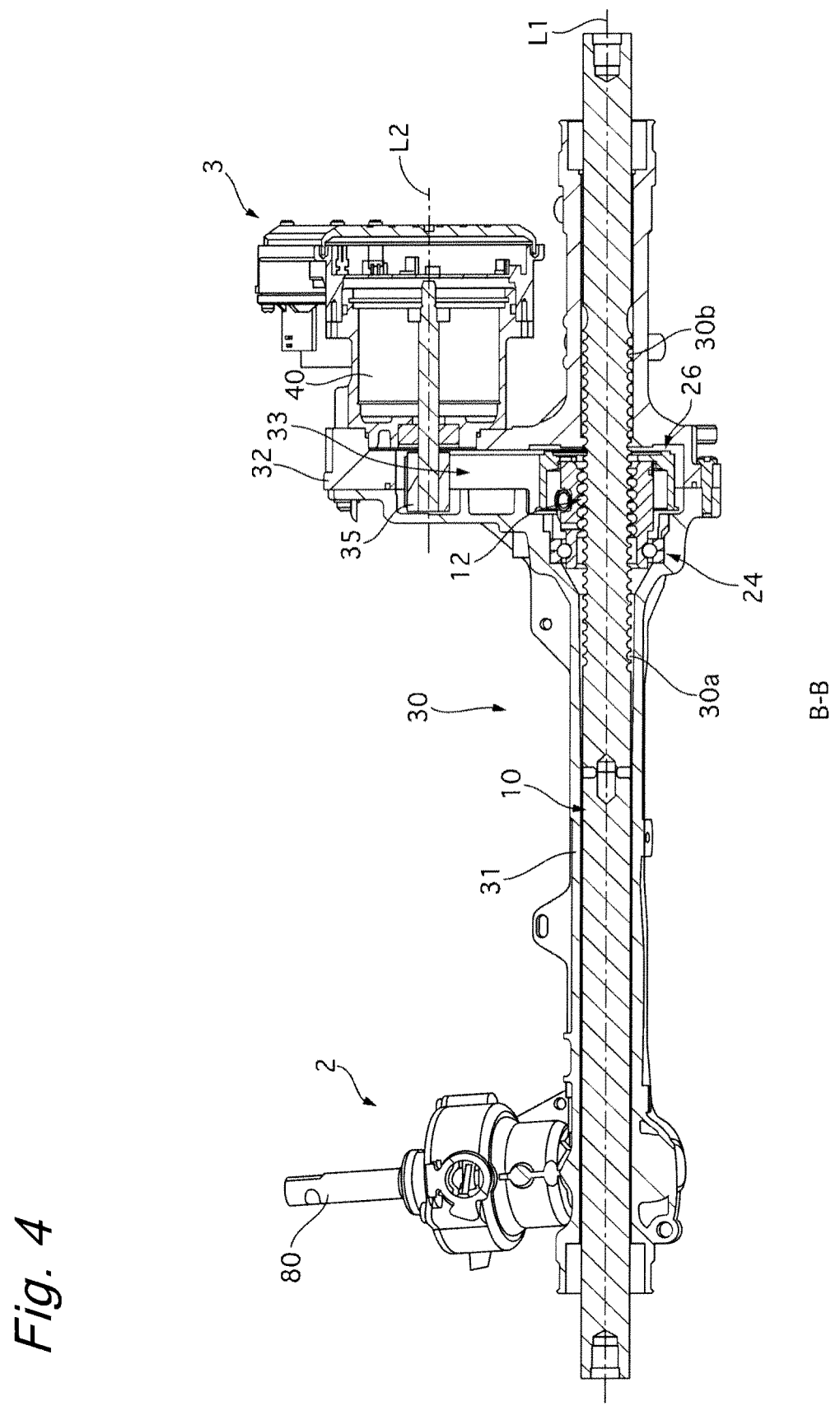
FIG. 4 is a sectional view of the power steering apparatus according to the first embodiment.

FIG. 1 is a front view of the power steering apparatus 1. FIG. 2 is an axial view of the power steering apparatus 1. FIG. 3 is a sectional view taken along the line A-A in FIG. 1. FIG. 4 is a sectional view taken along the line B-B in FIG. 2.

The power steering apparatus 1 has a steering mechanism 2 transmitting the rotation of a steering wheel turned by the driver to a wheel turning shaft 10 for steering wheels to be steered. The power steering apparatus 1 further has an assist mechanism 3 imparting assist force to the wheel turning shaft 10. The steering mechanism 2 has a steering input shaft 80 connected to the steering wheel, and a pinion 81 rotating together with the steering input shaft 80 as one unit. The pinion 81 is meshed with a rack 13 formed on the outer periphery of the wheel turning shaft 10.

The components of the power steering apparatus 1 are accommodated in a housing 30 comprising a wheel turning shaft housing portion 31 accommodating the wheel turning shaft 10 movably in an axial direction, and a reduction mechanism housing portion 32 disposed at an intermediate position in the axial direction of the wheel turning shaft housing portion 31 so as to surround the wheel turning shaft 10. The reduction mechanism housing portion 32 accommodates a reduction mechanism 33 (described later).

The assist mechanism 3 has an electric motor 40 and a screw mechanism 26 which is capable of transmitting an output from the electric motor 40 to the wheel turning shaft 10. The electric motor 40 is controlled by a motor controller to deliver an output according to the steering torque and steering quantity input to the steering wheel by the driver. The screw mechanism 26 has a nut 20 and an output pulley 27. The output pulley 27 has an appearance of a circular cylindrical member and is secured to the nut 20 so as to be rotatable together therewith as one unit. The electric motor 40 has a circular cylindrical input pulley 35 secured to a drive shaft thereof so as to be rotatable together therewith as one unit. The output pulley 27 and the input pulley 35 are connected by a belt 28. The reduction mechanism 33 comprises the input pulley 35, the output pulley 27, and the belt 28. It should be noted that, in the following, the axis of rotation of the nut 20 and the output pulley 27 is defined as a first reference axis L1, and the axis of rotation of the electric motor 40 and the input pulley 35 is defined as a second reference axis L2.

The nut 20 is annularly formed so as to surround the wheel turning shaft 10 and is provided rotatably relative to the wheel turning shaft 10. The nut 20 has a spiral groove formed on the inner periphery thereof. A nut-side ball screw groove 21 may comprises the groove. The wheel turning shaft 10 has a spiral groove formed on the outer periphery thereof at a position axially spaced from a portion thereof where the above-described rack 13 is formed. A wheel turning shaft-side ball screw groove 11 may comprises the spiral groove. When the nut 20 is fitted over the wheel turning shaft 10, the nut-side ball screw groove 21 and the wheel turning shaft-side ball screw groove 11 form a ball recirculation groove 12. The ball recirculation groove 12 is filled with a plurality of metallic balls 22. As the nut 20 rotates, the balls 22 move through the ball recirculation groove 12, thereby causing the wheel turning shaft 10 to move longitudinally relative to the nut 20.

[Structure of Nut]

Figure 5:
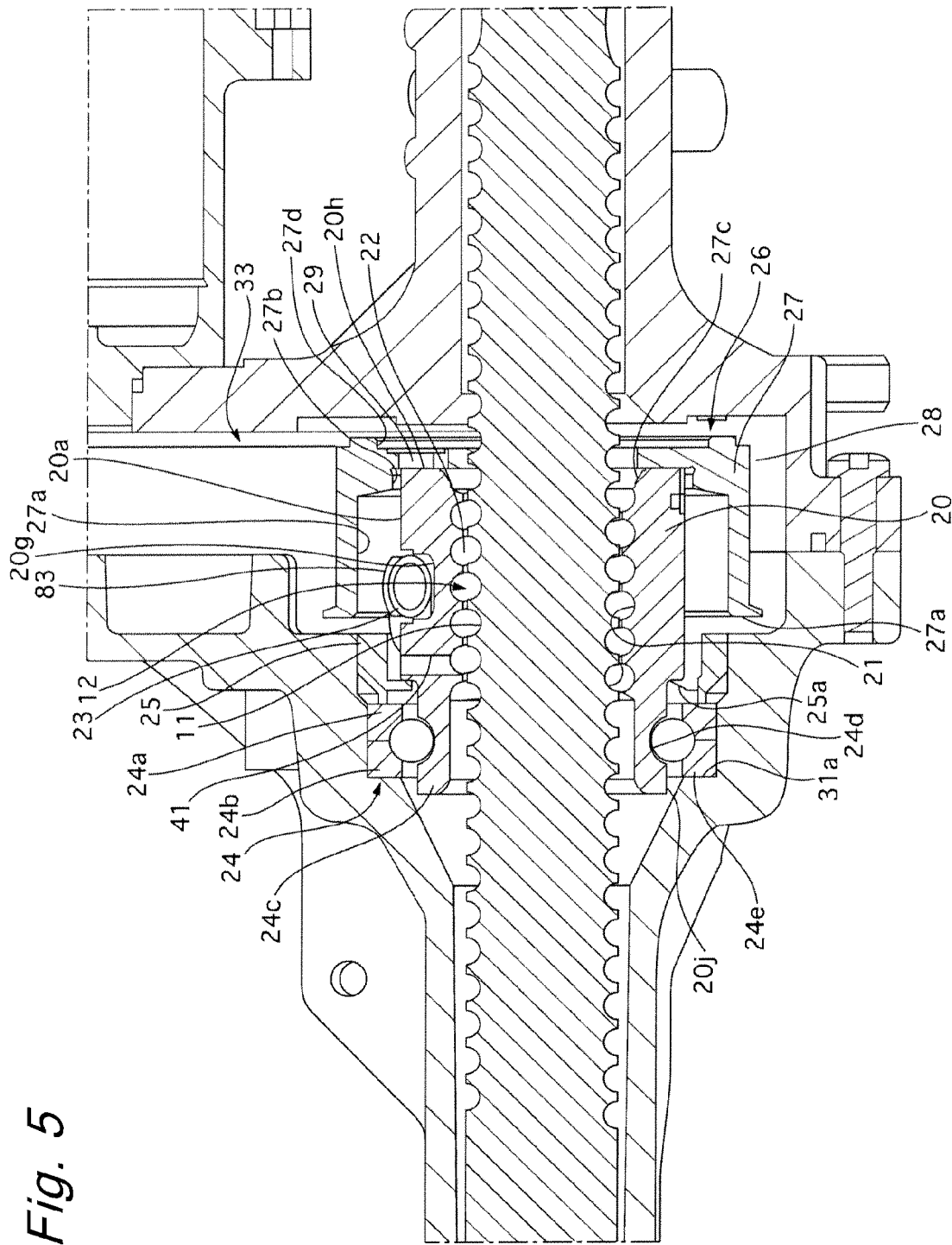
FIG. 5 is an enlarged sectional view of an assist mechanism and its vicinities in the first embodiment.
Figure 6:
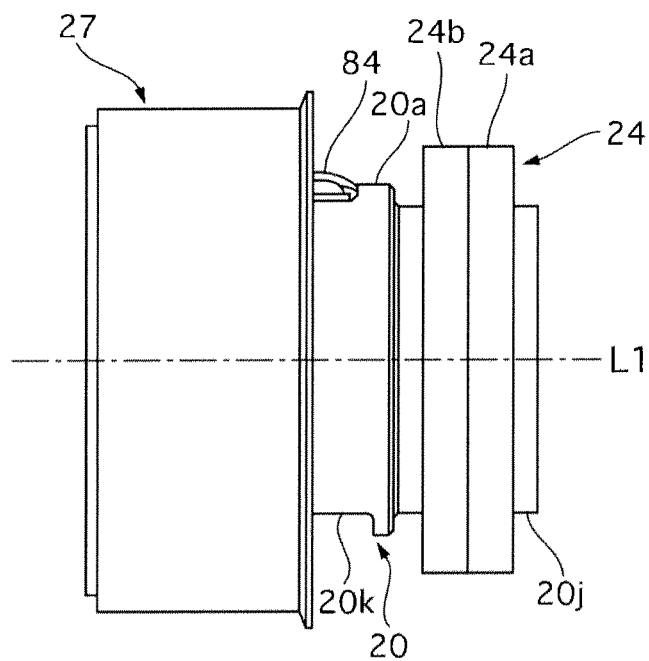
FIG. 6 is a radial view of a nut with a recirculation member, a bearing and an output pulley attached thereto in the first embodiment, as viewed from outside in the radial direction of the nut.
Figure 7:
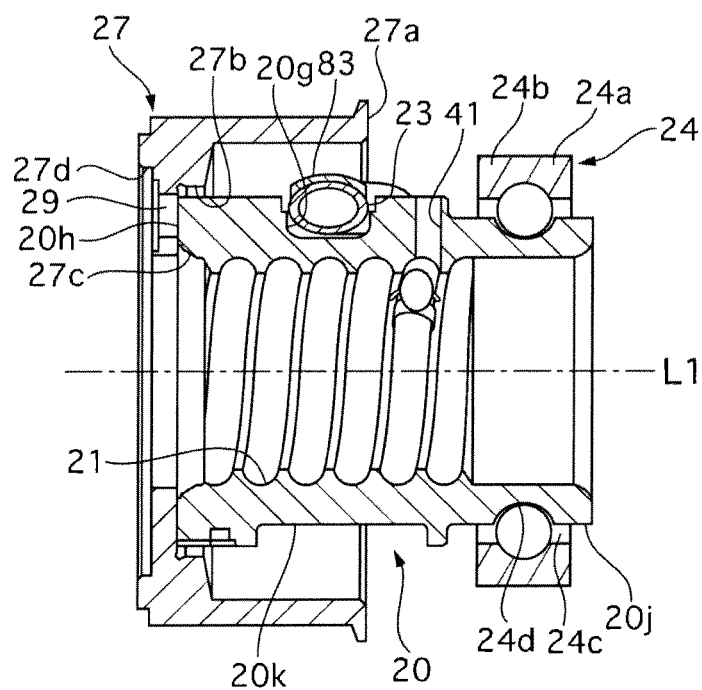
FIG. 7 is a sectional view of the nut with the recirculation member, the bearing and the output pulley attached thereto in the first embodiment.
Figure 8:
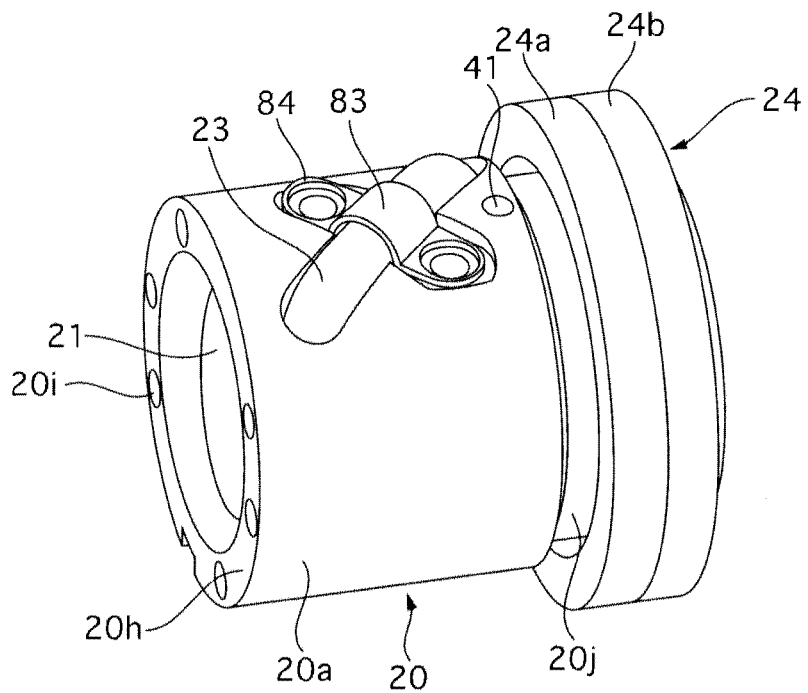
FIG. 8 is a perspective view of the nut with the recirculation member and the bearing attached thereto in the first embodiment.
Figure 9:
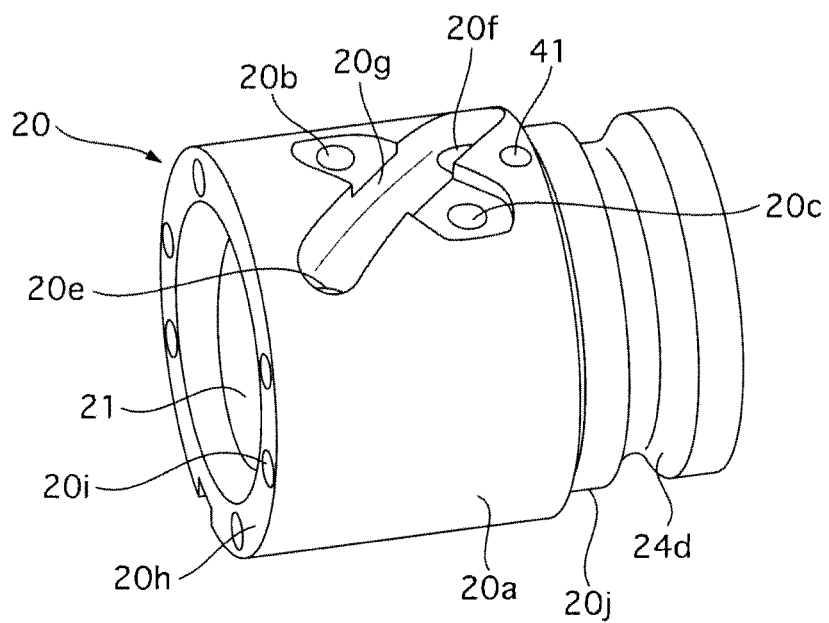
FIG. 9 is a perspective view of the nut in the first embodiment.
Figure 10:
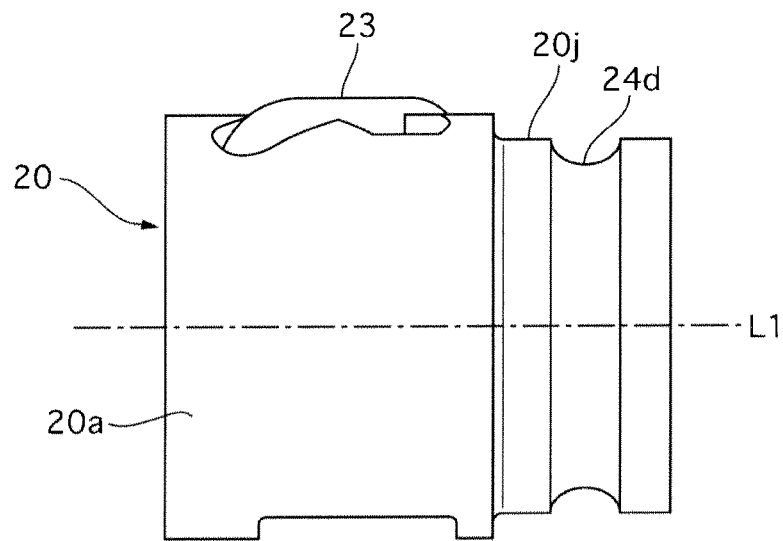
FIG. 10 is a radial view of the nut with the recirculation member attached thereto in the first embodiment, as viewed from outside in the radial direction of the nut.
Figure 11:
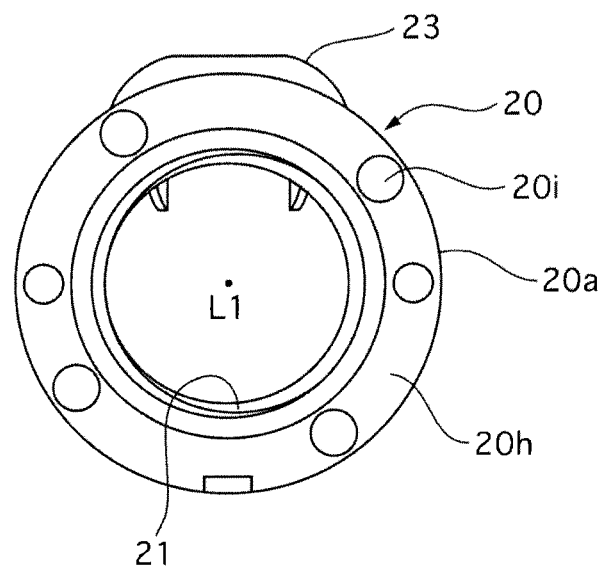
FIG. 11 is an axial view of the nut with the recirculation member attached thereto in the first embodiment, as viewed from the axial direction of the nut.

FIG. 5 is an enlarged sectional view of the assist mechanism 3 of the power steering apparatus 1 and its vicinities. FIG. 6 is a radial view of the nut 20 with a recirculation member 23, a bearing 24 and an output pulley 27 attached thereto. FIG. 7 is a sectional view of the nut 20 with the recirculation member 23, the bearing 24 and the output pulley 27 attached thereto. FIG. 8 is a perspective view of the nut 20 with the recirculation member 23 and the bearing 24 attached thereto. FIG. 9 is a perspective view of the nut 20 alone as a single component. FIG. 10 is a radial view of the nut 20 with the recirculation member 23 attached thereto. FIG. 11 is an axial view of the nut 20 with the recirculation member 23 attached thereto.

The nut 20 has one end portion (left-hand end portion in FIG. 5) and the other end portion (right-hand end portion in FIG. 5). The one end portion of the nut 20 comprises a small-diameter portion 20*j*. The other end portion of the nut 20 comprises a large-diameter portion 20*a*. The small-diameter portion 20*j* is smaller in outer diameter than the large-diameter portion 20*a*. The outer diameter of the large-diameter portion 20*a* is uniform throughout the entire length thereof in the direction of the first reference axis L1.

The small-diameter portion 20*j* has an inner race 24*c* of the bearing 24 formed integrally therewith. The bearing 24 is a ball bearing having two split outer races 24*a* and 24*b* and balls 24*d* provided between the outer races 24*a* and 24*b* and the inner race 24*c*. The bearing 24 rotatably supports the nut 20 relative to the reduction mechanism housing portion 32.

The large-diameter portion 20*a* has a nut-side ball screw groove 21 formed on the inner periphery thereof. The nut-side ball screw groove 21 is not formed on the inner periphery of the small-diameter portion 20*j*. The large-diameter portion 20*a* has a one end-side ball recirculation hole 20*f* extending therethrough from the outer periphery thereof toward one end of the ball recirculation groove 12. The large-diameter portion 20*a* further has an other end-side ball recirculation hole 20*e* extending therethrough from the outer periphery thereof toward the other end of the ball recirculation groove 12. Between the one end-side ball recirculation hole 20*f* and the other end-side ball recirculation hole 20*e* is formed an engagement groove 20*g* in which a recirculation member 23 (described later) is engaged. The one end-side ball recirculation hole 20*f* and the other end-side ball recirculation hole 20*e* are fitted with the opposite ends of a tube-shaped recirculation member 23 connecting the two ball recirculation holes 20*e* and 20*f*. The recirculation member 23 as assembled into the nut 20 projects radially from the outer peripheral surface of the nut 20 (see FIGS. 10 and 11).

The large-diameter portion 20*a* has a pair of internally threaded portions 20*b* and 20*c* formed on the outer periphery thereof. A securing metal 83 is fastened to the internally threaded portions 20*b* and 20*c* with screws 84 to secure the recirculation member 23 to the nut 20 (see FIG. 8). The securing metal 83 is attached to the nut 20 so as to extend in a direction perpendicular to the longitudinal axis of the recirculation member 23.

The balls 22 in the ball recirculation groove 12 each enter the recirculation member 23 when coming to a position of the ball recirculation groove 12 where the one end-side ball recirculation hole 20*f* is formed, and pass through the recirculation member 23 before being returned to the ball recirculation groove 12 from the other end-side ball recirculation hole 20*e*. That is, the balls 22 do not move throughout the ball recirculation groove 12 from one end to the other thereof but move from the position where the one end-side ball recirculation hole 20*f* is formed to the position of the other end-side ball recirculation hole 20*e*. It should be noted that, when the wheel turning shaft 10 moves in the opposite direction, the direction of movement of the balls 22 is also opposite to the above.

The nut 20 has an output pulley abutting surface 20*h* formed on one axial end side thereof. The output pulley abutting surface 20*h* is formed by a surface substantially perpendicular to the first reference axis L1. The output pulley abutting surface 20*h* is provided with a plurality of internally threaded holes 20*i*.

The output pulley 27 is formed in the shape of a hollow circular cylinder. The inner periphery of the output pulley 27 comprises, in order from the one end side thereof, a large-diameter portion 27*a*, a small-diameter portion 27*b*, a flange portion 27*c*, and an opening portion 27*d*. The inner diameter of the large-diameter portion 27*a* is larger than the diameter of the outermost peripheral portion of the nut 20 as equipped with the recirculation member 23 secured to the large-diameter portion 20*a*. The inner diameter of the small-diameter portion 27*b* is somewhat larger than the diameter of the large-diameter portion 20*a*. The inner diameter of the flange portion 27*c* is substantially the same as the inner diameter of the output pulley abutting surface 20*h*. The inner diameter of the opening portion 27*d* is larger than the inner diameter of the small-diameter portion 27*b* and smaller than the inner diameter of the large-diameter portion 27*a*.

The flange portion 27*c* has through-holes axially extending therethrough at respective positions corresponding to the internally threaded holes 20*i* formed in the output pulley abutting surface 20*h* of the nut 20. The output pulley 27 is fitted onto the nut 20 from the large-diameter portion 27*a* side thereof until the side surface of the flange portion 27*c* abuts against the output pulley abutting surface 20*h*, thereby axially positioning the output pulley 27 relative to the nut 20. Bolts 29 are inserted into the through-holes of the output pulley 27 and engaged with the internally threaded holes 20*i* of the nut 20, thereby securing the output pulley 27 to the nut 20 so that the output pulley 27 is rotatable together with the nut 20 as one unit.

The output pulley 27 is configured so that, when secured to the nut 20, the output pulley 27 overlaps a region of the ball recirculation groove 12 where the plurality of balls 22 recirculate but does not overlap the bearing 24 in the direction of the first reference axis L1.

The nut 20 has a recess 20k on the side of the large-diameter portion 20a opposite to the side thereof where the engagement groove 20g is provided. The recess 20k is formed by cutting a part of the large-diameter portion 20a. More specifically, the recess 20k is formed by cutting the wall of the large-diameter portion 20a by an amount substantially equal to the volumetric capacity of the engagement groove 20g, thereby adjusting the weight balance in the circumferential direction of the nut 20.

The nut 20 has a communication hole 41 formed on the side of the large-diameter portion 20a provided with the recirculation member 23 at a position closer to the inner race 24c (closer to the one end of the nut 20). The communication hole 41 communicates between the outer and inner peripheries of the nut 20. The inner periphery-side opening of the communication hole 41 is formed to open into the nut-side ball screw groove 21 at a position off the region of the nut-side ball screw groove 21 where the balls 22 recirculate. The communication hole 41 provides communication between one chamber 30a and the other chamber 30b. The one chamber 30a is located at one side (left-hand side in FIG. 4) of the bearing 24 and the screw mechanism 26. The other chamber 30b is located on the other side (right-hand side in FIG. 4) of the bearing 24 and the screw mechanism 26.

The nut 20 is restrained from axially moving relative to the housing 30 by clamping the outer races 24a and 24b of the bearing 24 between a side surface 31a at one end of the reduction mechanism housing portion 32 and a lock ring 25.

[Nut Manufacturing Method]

Figure 12:
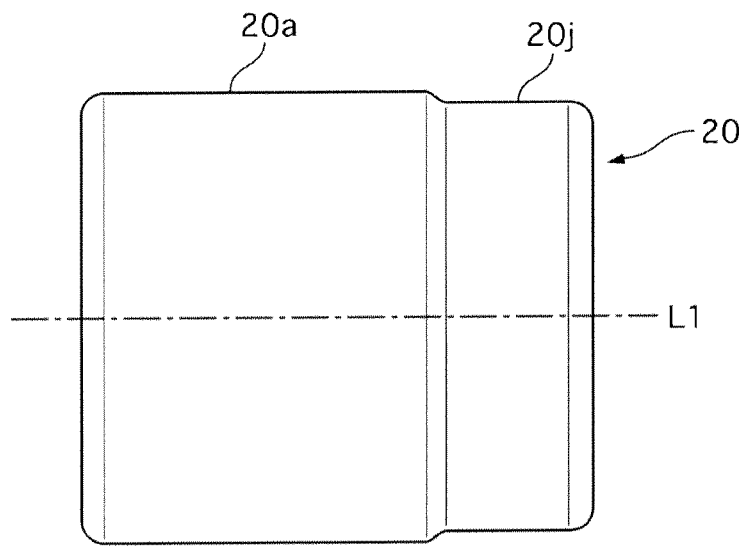
FIG. 12 is a radial view of the nut of the first embodiment after completion of forging process, as viewed from outside in the radial direction of the nut.
Figure 13:
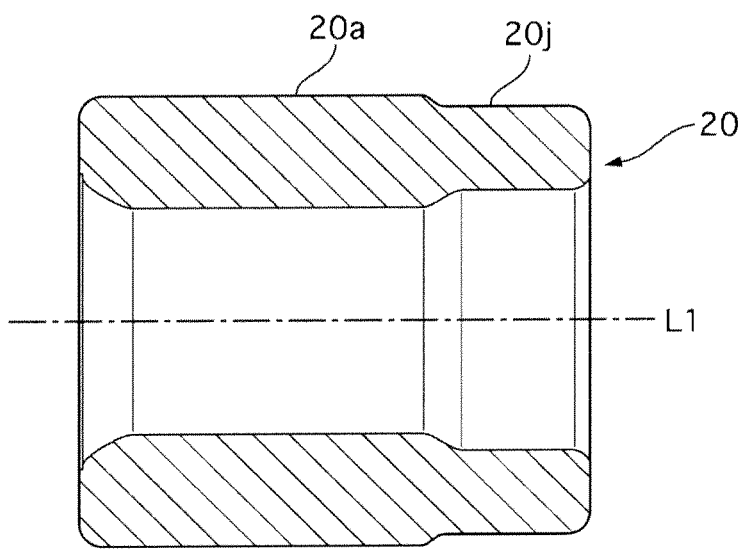
FIG. 13 is a sectional view of the nut of the first embodiment after completion of forging process.

The nut 20 is formed in the shape of a circular cylinder by a die forging process. In the die forging process, the die is released in the direction of the first reference axis L1. FIG. 12 is a radial view of the nut 20 after completion of the forging process. FIG. 13 is a sectional view of the nut 20 after completion of the forging process.

The nut 20 is provided with the nut-side ball screw groove 21, the communication hole 41, the engagement groove 20g, the inner race 24c, and so forth by cutting the circular cylindrical member formed by forging.

[Operation]

It is necessary, in order to mass-produce the nut 20 at low cost, to use a forging process to form a circular cylindrical member as a material of the nut 20. It is also necessary to reduce the overall parts count of the screw mechanism 26. In addition, it is necessary to reduce the overall axial length of the screw mechanism 26.

Accordingly, in the first embodiment, the nut 20 is formed by a die forging process in which a die used for the die forging process is released in a direction along the direction of the first reference axis L1. In addition, the nut 20 is formed with an output pulley abutting surface 20h formed by a surface substantially perpendicular to the first reference axis L1, and the output pulley 27 is abutted against the output pulley abutting surface 20h, thereby allowing the output pulley 27 to be positioned relative to the nut 20 in the direction of the first reference axis L1. In this state, the output pulley 27 is secured to the nut 20. Further, the output pulley 27 is formed into a circular cylindrical configuration such that the output pulley 27 overlaps a region of the ball recirculation groove 12 where the plurality of balls 22 recirculate but does not overlap the bearing 24 in the direction of the first reference axis L1.

By forming a circular cylindrical member as a material of the nut 20 by die forging, the yield can be improved as compared to a nut forming process in which the hollow portion of the circular cylindrical member is formed by cutting or the like. In addition, because the nut 20 is formed with the output pulley abutting surface 20h, it is unnecessary to provide a member for axially positioning the output pulley 27 separately from the nut 20. Further, because the output pulley 27 is configured to overlap at least a part of the ball recirculation groove 12, the axial dimension of the screw mechanism 26 can be reduced.

In the first embodiment, the large-diameter portion 20a of the nut 20 is formed so that the outer diameter of the large-diameter portion 20a is uniform throughout the entire length thereof in the direction of the first reference axis L1. Accordingly, there is no projection on the outer periphery of the large-diameter portion 20a. Therefore, it is possible to improve die releasability and hence possible to improve manufacturability.

In the first embodiment, the inner race 24c of the bearing 24 is formed integrally with the nut 20 at the small-diameter portion 20j thereof. Accordingly, it is unnecessary to provide a member for securing the inner race 24c to the nut 20, and it is possible to suppress an increase in the number of components.

In the first embodiment, the recirculation member 23 is configured to project radially from the outer peripheral surface of the nut 20. Accordingly, the wall thickness of the nut 20 can be reduced, and it is possible to reduce the radial dimension and weight of the nut 20.

In the first embodiment, the nut 20 is provided with the recess 20k at a position opposite to the engagement groove 20g in the circumferential direction. The provision of the engagement groove 20g causes a weight reduction in a circumferential region of the nut 20; however, the provision of the recess 20k allows an improvement in weight balance in the circumferential direction of the nut 20.

In the first embodiment, the securing metal 83 is disposed to extend in a direction perpendicular to the longitudinal direction of the recirculation member 23. Accordingly, it is possible to reduce the dimension of the securing metal 83 in the direction of the first reference axis L1 as compared to a structure in which the securing metal 83 is provided to extend in the direction of the first reference axis L1, and hence possible to reduce the axial dimension of the nut 20.

In the first embodiment, the nut-side ball screw groove 21 is formed on only the inner periphery of the large-diameter portion 20a of the nut 20. Thus, no nut-side ball screw groove 21 is formed on the small-diameter portion 20j, which is smaller in outer diameter than the large-diameter portion 20a. Accordingly, it is possible to suppress degradation of the balance of mechanical strength due to a variation in radial wall thickness of the nut 20.

[Advantages]

(1) A power steering apparatus includes: a wheel turning shaft 10 which moves in an axial direction in response to rotation of a steering wheel to steer a wheel to be steered;
a housing 30 having a wheel turning shaft housing portion 31 accommodating the wheel turning shaft 10 movably in the axial direction, and a reduction mechanism housing portion 32 disposed at an intermediate position in the axial direction of the wheel turning shaft housing portion 31 so as to surround the wheel turning shaft;
a wheel turning shaft-side ball screw groove 11 provided on the outer periphery of the wheel turning shaft 10 in a spiral groove configuration;
a nut 20 which is a rotary element provided in the reduction mechanism housing portion 32, the rotary element being formed annularly so as to surround the wheel turning shaft 10 by a die forging process in which, when an axis of rotation of the rotary element is defined as a first reference axis L1, a die used for the die forging process is released in a direction along the direction of the first reference axis L1;

a bearing 24 provided between the inner wall of the reduction mechanism housing portion 32 and the nut 20 in a radial direction radial to a central axis defined by the axis of rotation of the nut 20, the bearing 24 configured to surround the nut 20 to rotatably support the nut 20 relative to the housing 30;

a nut-side ball screw groove 21 provided on the inner periphery of the nut 20 in a spiral groove configuration to configure a ball recirculation groove 12 in combination with the wheel turning shaft-side ball screw groove 11;

a plurality of balls 22 provided in the ball recirculation groove 12;

an output pulley abutting surface 20h provided on the nut 20 at a position closer to the ball recirculation groove 12 than the bearing 24 in the direction of the first reference axis L1, the output pulley abutting surface 20h being formed by a surface substantially perpendicular to the first reference axis L1;

a circular cylindrical output pulley 27 secured to the nut 20 in a state where the output pulley 27 has been positioned relative to the nut 20 in the direction of the first reference axis L1 by abutting against the output pulley abutting surface 20h, the output pulley 27 overlapping a region of the ball recirculation groove 12 where the plurality of balls 22 recirculate but not overlapping the bearing 24 in the direction of the first reference axis L1;

a circular cylindrical input pulley 35 disposed such that a second reference axis L2 defined by an axis of rotation of the input pulley 35 is offset from the first reference axis L1 in the radial direction;

a belt 28 (a transmitting member) provided to extend over the output pulley 27 and the input pulley 35 to transmit rotation of the input pulley 35 to the output pulley 27;

an electric motor 40 arranged to rotationally drive the input pulley 35 to rotationally drive the nut 20 through the belt 28 and the output pulley 27, so that rotation of the nut 20 is converted into axial motion of the wheel turning shaft 10, thereby applying steering force to the wheel turning shaft 10; and a recirculation member 23 provided to connect one end and other end of the ball recirculation groove 12 so that the plurality of balls 22 are recirculatable in either direction between the one end and other end of the ball recirculation groove 12.

Accordingly, because a circular cylindrical member as a material of the nut 20 is formed by die forging, the yield can be improved as compared to a nut forming process in which the hollow portion of the circular cylindrical member is formed by cutting or the like. In addition, because the nut 20 is formed with the output pulley abutting surface 20h, it is unnecessary to provide a member for axially positioning the output pulley 27 which is separately formed from the nut 20. Further, because the output pulley 27 is configured to overlap at least a part of the ball recirculation groove 12, the axial dimension of the screw mechanism 26 can be reduced.

(2) The nut 20 has a small-diameter portion 20j provided closer to the bearing 24 than the recirculation member 23 in the direction of the first reference axis L1. The small-diameter portion 20j is smaller in outer diameter than a large-diameter portion 20a where the recirculation member 23 is provided. The outer races 24a and 24b are disposed around the outer periphery of the small-diameter portion 20j. The outer diameter of the large-diameter portion 20a is uniform throughout the entire length thereof in the direction of the first reference axis L1.

Accordingly, it is possible to improve die releasability and hence possible to improve manufacturability.

(3) The bearing 24 is a ball bearing having an inner race 24c, outer races 24a, and 24b, and a plurality of balls 24d provided between the inner race 24c and the outer races 24a and 24b. The inner race 24c is formed integrally with the nut 20.

Accordingly, it is unnecessary to provide a member for securing the inner race 24c to the nut 20, and it is possible to suppress an increase in the number of components.

(4) The nut 20 has a pair of ball recirculation holes 20e and 20f each opening at one end thereof into the nut-side ball screw groove 21 and at the other end thereof on the outer periphery of the nut 20. The recirculation member 23 is provided to connect the pair of ball recirculation holes 20e and 20f to each other. The nut 20 is formed so that the recirculation member 23 projects from the outer peripheral surface of the nut 20 in the radial direction.

Accordingly, the wall thickness of the nut 20 can be reduced, and it is possible to reduce the radial dimension and weight of the nut 20.

(5) The nut 20 has a pair of ball recirculation holes 20e and 20f each opening at one end thereof into the nut-side ball screw groove 21 and at the other end thereof on the outer periphery of the nut 20. The nut 20 further has an engagement groove 20g (a U-groove) provided on the outer periphery of the nut 20 to open outward in the radial direction so as to connect the pair of ball recirculation holes 20e and 20f to each other. The recirculation member 23 is disposed so that at least a part of the recirculation member 23 is accommodated in the engagement groove 20g, and to connect the pair of ball recirculation holes 20e and 20f to each other. When a circular direction around the first reference axis L1 is defined as a circumferential direction, the nut 20 has a recess 20k at a position opposite to the engagement groove 20g in the circumferential direction.

Accordingly, it is possible to improve the weight balance in the circumferential direction of the nut 20.

(6) The nut 20 has a pair of ball recirculation holes 20e and 20f each opening at one end thereof into the nut-side ball screw groove 21 and at the other end thereof on the outer periphery of the nut 20. The nut 20 further has an engagement groove 20g provided on the outer periphery of the nut 20 to open outward in the radial direction so as to connect the pair of ball recirculation holes 20e and 20f to each other. The recirculation member 23 is disposed so that at least a part of the recirculation member 23 is accommodated in the engagement groove 20g, and to connect the pair of ball recirculation holes 20e and 20f to each other. The recirculation member 23 is secured to the nut 20 with a securing metal 83 (a securing member) disposed outside the recirculation member 23 in the radial direction. The securing metal 83 extends in a direction perpendicular to the longitudinal direction of the recirculation member 23. A pair of screws 84 (securing parts) are provided at the opposite sides of the recirculation member 23 in the direction perpendicular to the longitudinal direction of the recirculation member 23 to secure the securing metal 83 to the nut 20.

Accordingly, it is possible to reduce the dimension of the securing metal 83 in the direction of the first reference axis L1 as compared to a structure in which the securing metal 83 is provided to extend in the direction of the first reference axis L1, and hence possible to reduce the axial dimension of the nut 20.

(7) A power steering apparatus includes:

a wheel turning shaft 10 which moves in an axial direction in response to rotation of a steering wheel to steer a wheel to be steered;

a housing 30 having a wheel turning shaft housing portion 31 accommodating the wheel turning shaft 10 movably in the axial direction, and a reduction mechanism housing portion 32 disposed at an intermediate position in the axial direction of the wheel turning shaft housing portion 31 so as to surround the wheel turning shaft;

a wheel turning shaft-side ball screw groove 11 provided on the outer periphery of the wheel turning shaft 10 in a spiral groove configuration;

a nut 20 which is a rotary element provided in the reduction mechanism housing portion 32, the rotary element being formed annularly so as to surround the wheel turning shaft 10 by a die forging process in which, when an axis of rotation of the rotary element is defined as a first reference axis L1, a die used for the die forging process is released in a direction along the direction of the first reference axis L1;

a bearing 24 provided between the inner wall of the reduction mechanism housing portion 32 and the nut 20 in a radial direction radial to a central axis defined by the axis of rotation of the nut 20, the bearing 24 configured to surround the nut 20 to rotatably support the nut 20 relative to the housing 30;

a nut-side ball screw groove 21 provided on the inner periphery of the nut 20 in a spiral groove configuration only in a range where the outer diameter of the nut 20 is uniform in the direction of the first reference axis L1, to configure a ball recirculation groove 12 in combination with the wheel turning shaft-side ball screw groove 11;

a plurality of balls 22 provided in the ball recirculation groove 12;

a circular cylindrical output pulley 27 secured to the nut 20;

a circular cylindrical input pulley 35 disposed such that a second reference axis L2 defined by an axis of rotation of the input pulley 35 is offset from the first reference axis L1 in the radial direction;

a belt 28 (a transmitting member) provided to extend over the output pulley 27 and the input pulley 35 to transmit rotation of the input pulley 35 to the output pulley 27;

an electric motor 40 arranged to rotationally drive the input pulley 35 to rotationally drive the nut 20 through the belt 28 and the output pulley 27, so that rotation of the nut 20 is converted into axial motion of the wheel turning shaft 10, thereby applying steering force to the wheel turning shaft 10;

a pair of ball recirculation holes 20e and 20f each provided in the nut 20 to open at one end thereof into the nut-side ball screw groove 21 and at the other end thereof on the outer periphery of the nut 20; and a recirculation member 23 provided to connect the pair of ball recirculation holes 20e and 20f to each other so that the plurality of balls 22 are recirculatable in either direction between one end and other end of the ball recirculation groove 12.

Accordingly, it is unnecessary to provide a communication hole in the housing 30 and hence possible to suppress a reduction in mechanical strength of the housing 30. In addition, because the nut-side ball screw groove 21 is provided on the inner periphery of the nut 20 only in a range where the outer diameter of the nut 20 is uniform, it is possible to suppress degradation of the balance of mechanical strength due to a variation in radial wall thickness of the nut 20.

A second embodiment of the present invention differs from the first embodiment mainly in the respective structures of the output pulley 27 and bearing 24. In the following description of the second embodiment, an explanation of the same structures as those of the first embodiment is omitted.

[Structure of Nut]

Figure 14:
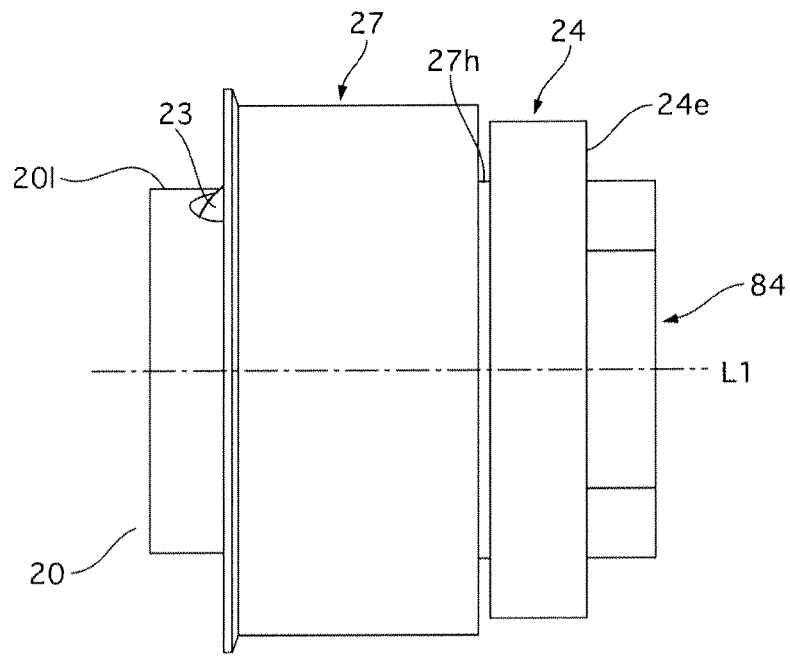
FIG. 14 is a radial view of a nut with an output pulley and a bearing attached thereto in a second embodiment of the present invention, as viewed from outside in the radial direction of the nut.
Figure 15:
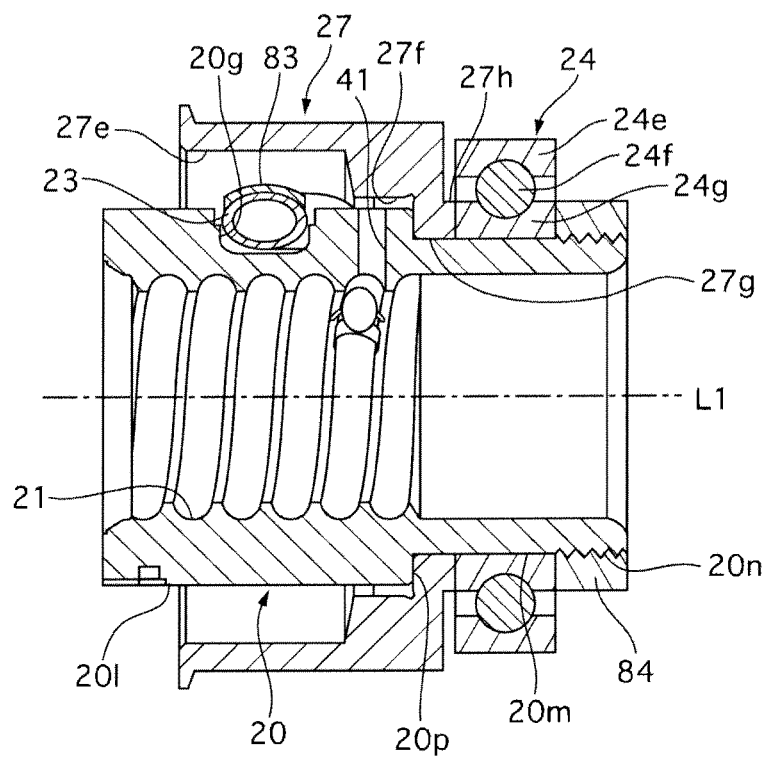
FIG. 15 is a sectional view of the nut with the output pulley and the bearing attached thereto in the second embodiment.

FIG. 14 is a radial view of a nut 20 with an output pulley 27 and a bearing 24 attached thereto, as seen from outside in the radial direction of the nut 20. FIG. 15 is a sectional view of the nut 20 with the output pulley 27 and the bearing 24 attached thereto.

The nut 20 has one end portion (right-hand end portion in FIG. 15) and the other end portion (left-hand end portion in FIG. 15). The one end portion of the nut 20 may configure a small-diameter portion 20m. The other end portion of the nut 20 may configure a large-diameter portion 20l. The small-diameter portion 20m is smaller in outer diameter than the large-diameter portion 20l. The small-diameter portion 20m has a thread cut on the outer periphery of one end thereof to form an external thread groove 20n. The outer diameter of the large-diameter portion 20l is uniform throughout the entire length thereof in the direction of the first reference axis L1. A nut-side ball screw groove 21 is provided in a region overlapping the large-diameter portion 20l in the direction of the first reference axis L1 but not overlapping the small-diameter portion 20m. A step 20p is formed between the large-diameter portion 20l and the small-diameter portion 20m. The side of the step 20p closer to the one end of the nut 20 is formed by a surface substantially perpendicular to the first reference axis L1.

The output pulley 27 is formed in the shape of a hollow circular cylinder. The inner periphery of the output pulley 27 comprises, in order from the other end side thereof, a large-diameter portion 27e, a small-diameter portion 27f, a flange portion 27g, and a bearing abutting portion 27h. The inner diameter of the large-diameter portion 27e is larger than the diameter of the outermost peripheral portion of the nut 20 as equipped with the recirculation member 23 secured to the large-diameter portion 20l. The inner diameter of the small-diameter portion 27f is somewhat larger than the outer diameter of the large-diameter portion 20l. The inner diameter of the flange portion 27g is substantially the same as the outer diameter of the small-diameter portion 20m of the nut 20. The inner diameter of the bearing abutting portion 27h is larger than the outer diameter of the small-diameter portion 20m of the nut 20, and the outer diameter of the bearing abutting portion 27h is smaller than the outer diameter of an inner race 24g of the bearing 24 (described later).

The bearing 24 comprises an outer race 24e, an inner race 24g, and a plurality of balls 24f provided between the outer race 24e and the inner race 24g. In the second embodiment, a commercially available bearing is used as the bearing 24. That is, the inner race 24g of the bearing 24 is not formed integrally with the nut 20.

From the large-diameter portion 27e side of the output pulley 27, the output pulley 27 is fitted onto the nut 20 from the one end side of the nut 20 until the flange portion 27g abuts against the step 20p of the nut 20, thereby allowing the output pulley 27 to be axially positioned relative to the nut 20. The large-diameter portion 27e and small-diameter portion 27f of the output pulley 27 overlap the large-diameter portion 20l of the nut 20 in the direction of the first reference axis L1. The flange portion 27g overlaps the small-diameter portion 20m of the nut 20 in the direction of the first reference axis L1.

After the output pulley 27 has been fitted onto the nut 20, the bearing 24 is fitted onto the nut 20 from the one end side of the nut until the inner race 24g abuts against the bearing abutting portion 27h of the output pulley 27, thereby allowing the bearing 24 to be axially positioned relative to the nut 20. That is, the inner race 24g is disposed on the outer periphery of the small-diameter portion 20m of the nut 20.

The output pulley 27 and the inner race 24g of the bearing 24 are clamped between the step 20p of the nut 20 and a lock nut 84 threadably engaged with the external thread groove 20n. Thus, the output pulley 27 and the inner race 24g of the bearing 24 are secured to the nut 20 so as to be rotatable together with the nut 20 as one unit.

[Operation]

In the second embodiment, the bearing 24 is a commercially available bearing having an inner race 24g as a separate component from the nut 20. Accordingly, a general-purpose bearing can be used as the bearing 24, and a cost reduction can be achieved.

In the second embodiment, the output pulley 27 and the inner race 24g of the bearing 24 are secured to the nut 20 so as to be rotatable together with the nut 20 as one unit by clamping the output pulley 27 and the inner race 24g between the step 20p of the nut 20 and the lock nut 84 threadably engaged with the external thread groove 20n. Accordingly, the output pulley 27 and the inner race 24g of the bearing 24 can share with each other a member for securing them to the nut 20. Thus, the number of components can be reduced.

In the second embodiment, the nut-side ball screw groove 21 is formed in a region not overlapping the small-diameter portion 20m in the direction of the first reference axis L1. Accordingly, there is no nut-side ball screw groove 21 on the small-diameter portion 20m, which is thinner in wall thickness than the large-diameter portion 20l. It is therefore possible to suppress a reduction in mechanical strength of the small-diameter portion 20m.

[Advantages]

(8) The bearing 24 is a ball bearing comprising an inner race 24g, an outer race 24e, and a plurality of balls 24f provided between the inner race 24g and the outer race 24e. The inner race 24g is a separate component from the nut 20.

Accordingly, a general-purpose bearing can be used as the bearing 24, and a cost reduction can be achieved.

(9) The nut 20 has a small-diameter portion 20m provided closer to the bearing 24 than the recirculation member 23 in the direction of the first reference axis L1 and smaller in outer diameter than a large-diameter portion 20l where the recirculation member 23 is provided. The nut 20 further has an external thread groove 20n formed on the outer periphery of the small-diameter portion 20m. The output pulley 27 and the inner race 24g are secured to the nut 20 by being clamped between a step 20p formed between the large-diameter portion 20l and small-diameter portion 20m of the nut 20 and a lock nut 84 provided on the outer periphery of the small-diameter portion 20m and threadably engaged with the external thread groove 20n.

Accordingly, the number of components can be reduced.

(10) The nut 20 has a small-diameter portion 20m provided closer to the bearing 24 than the recirculation member 23 in the direction of the first reference axis L1 and smaller in outer diameter than a large-diameter portion 20l where the recirculation member 23 is provided. The inner race 24g is disposed on the outer periphery of the small-diameter portion 20m. The nut-side ball screw groove 21 is formed in a region not overlapping the small-diameter portion 20m in the direction of the first reference axis L1.

Accordingly, it is possible to suppress a reduction in mechanical strength of the small-diameter portion 20m of the nut 20.

[Third Embodiment]

A third embodiment of the present invention differs from the first embodiment mainly in the structure of the bearing 24. In the following description of the third embodiment, an explanation of the same structures as those of the first embodiment is omitted.

[Structure of Nut]

Figure 16:
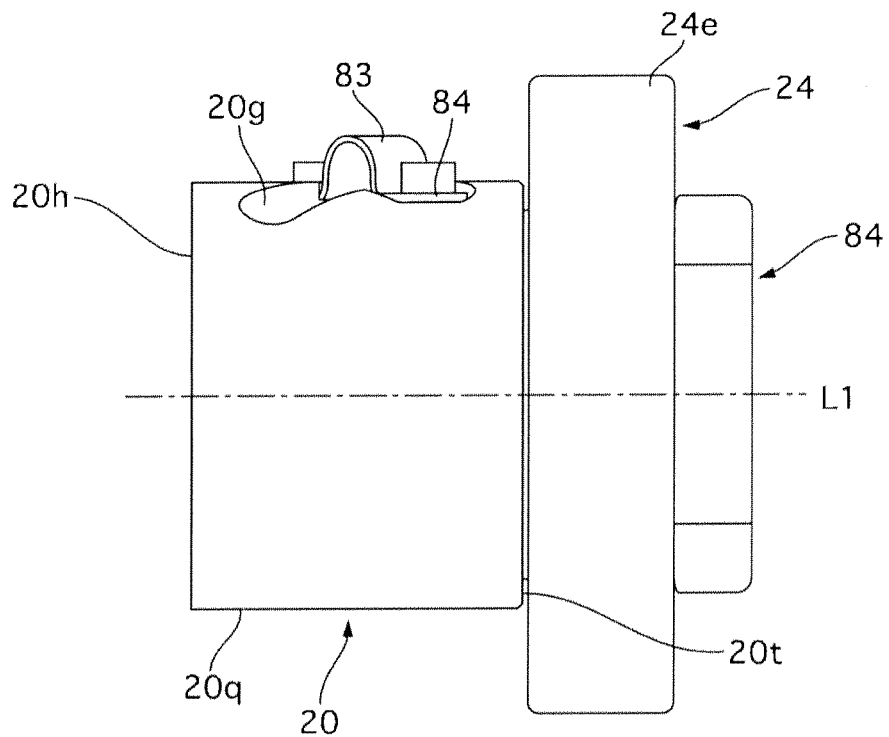
FIG. 16 is a radial view of a nut with a bearing attached thereto in a third embodiment of the present invention, as viewed from outside in the radial direction of the nut.
Figure 17:
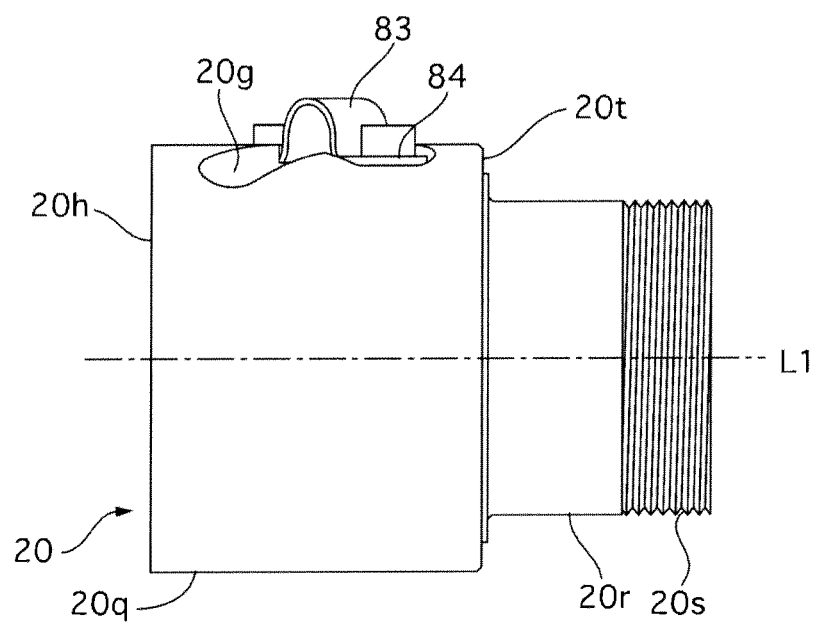
FIG. 17 is a radial view of the nut with the bearing removed therefrom in the third embodiment, as viewed from outside in the radial direction of the nut.
Figure 18:
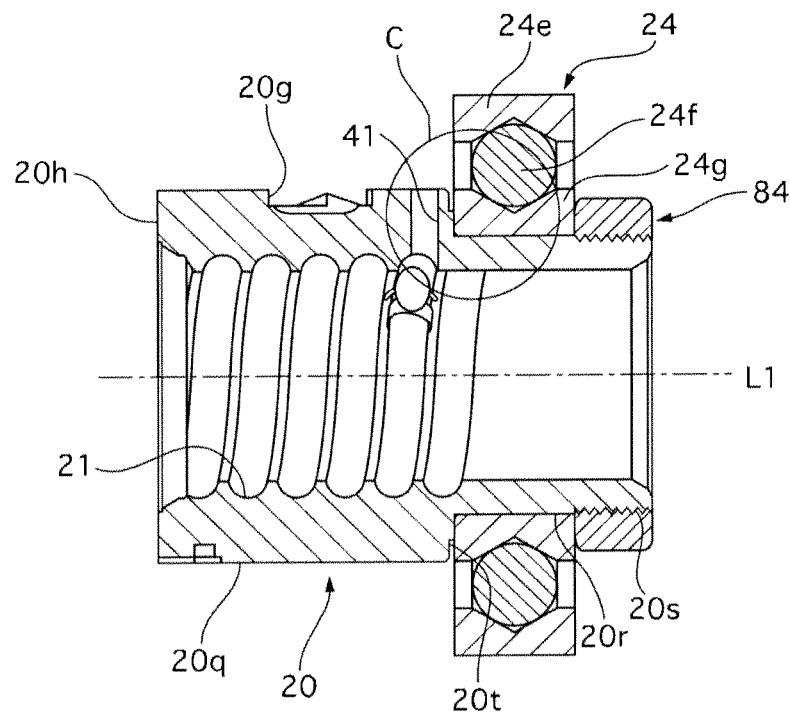
FIG. 18 is a sectional view of the nut with the bearing attached thereto in the third embodiment.
Figure 19:
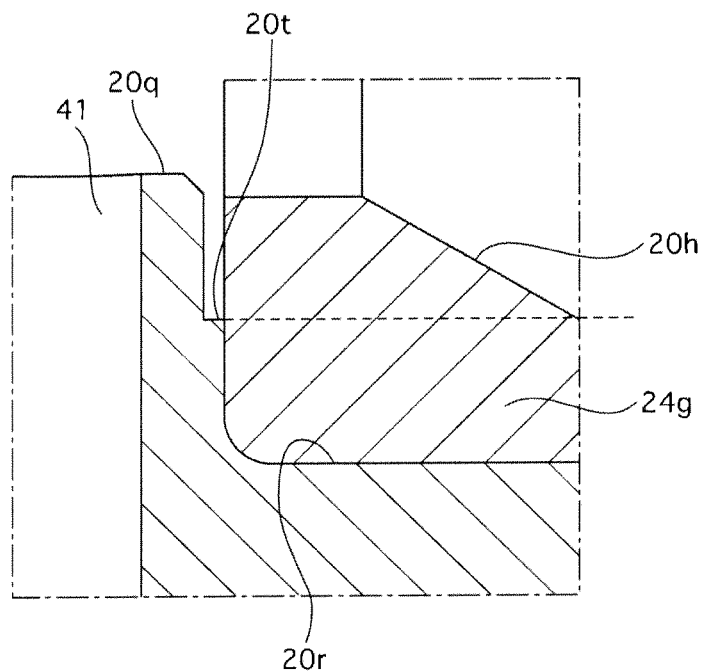
FIG. 19 is an enlarged view of an intermediate-diameter portion and its vicinities of the nut in the third embodiment.

FIG. 16 is a radial view of a nut 20 with a bearing 24 attached thereto, as viewed from outside in the radial direction of the nut 20. FIG. 17 is a radial view of the nut 20 with the bearing 24 removed therefrom, as viewed from outside in the radial direction of the nut 20. FIG. 18 is a sectional view of the nut 20 with the bearing 24 attached thereto. FIG. 19 is an enlarged view of a part encircled by the circle C in FIG. 18.

The nut 20 has one end portion (right-hand end portion in FIG. 18) and the other end portion (left-hand end portion in FIG. 18). The one end portion of the nut 20 constitutes a small-diameter portion 20r. The other end portion of the nut 20 constitutes a large-diameter portion 20q. The small-diameter portion 20r is smaller in outer diameter than the large-diameter portion 20q. The small-diameter portion 20r has a thread cut on the outer periphery of the one end thereof to form an external thread groove 20s. The outer diameter of the large-diameter portion 20q is uniform throughout the entire length thereof in the direction of the first reference axis L1. An intermediate-diameter portion 20t is formed at a step between the large-diameter portion 20q and the small-diameter portion 20r. The outer diameter of the intermediate-diameter portion 20t is smaller than that of the large-diameter portion 20q and larger than that of the small-diameter portion 20r. The outer diameter of the intermediate-diameter portion 20t is smaller than the diameter of the bottom of a raceway 24h of an inner race 24g of a bearing 24 (described later). In other words, the intermediate-diameter portion 20t is formed so as not to overlap the raceway 24h of the inner race 24g in the radial direction.

The bearing 24 comprises an outer race 24e, an inner race 24g, and a plurality of balls 24f provided between the outer race 24e and the inner race 24g. The third embodiment uses a commercially available bearing as the bearing 24. That is, the inner race 24g of the bearing 24 is not formed integrally with the nut 20. The bearing 24 is fitted onto the nut 20 from the one end side of the nut until the inner race 24g abuts against the intermediate-diameter portion 20t of the nut 20, thereby allowing the bearing 24 to be axially positioned relative to the nut 20. That is, the inner race 24g is disposed on the outer periphery of the small-diameter portion 20r of the nut 20. The inner race 24g of the bearing 24 is clamped between the intermediate-diameter portion 20t of the nut 20 and a lock nut 84 threadably engaged with the external thread groove 20s, thereby being secured to the nut 20 so as to be rotatable together with the nut 20 as one unit.

It should be noted that the output pulley 27 is secured to the output pulley abutting surface 20h of the nut 20 with the bolts 29 in the same way as the first embodiment.

[Operation]

In the third embodiment, the intermediate-diameter portion 20t of the nut 20 is formed so as not to overlap the bottom of the raceway 24h of the inner race 24g. The inner race 24g of the bearing 24 is abutted against the intermediate-diameter portion 20t in the direction of the first reference axis L1 and clamped between the intermediate-diameter portion 20t and the lock nut 84, thereby being secured to the nut 20.

Of the inner race 24g, a portion where the raceway 24h is formed is thinner in wall thickness than the rest of the inner race 24g and therefore relatively low in mechanical strength. In this regard, the intermediate-diameter portion 20t of the nut 20 abuts a portion of the inner race 24g that is radially inward of the raceway 24h. Accordingly, the load applied to the inner race 24g when secured does not act directly on the thin-wall portion of the inner race 24g. Therefore, it is possible to suppress deformation of the inner race 24g.

[Advantages]

(11) The nut 20 comprises a small-diameter portion 20r provided closer to the bearing 24 than the recirculation member 23 in the direction of the first reference axis L1 and smaller in outer diameter than a large-diameter portion 20q where the recirculation member 23 is provided, and an intermediate-diameter portion 20t provided between the large-diameter portion 20q and the small-diameter portion 20r and having an outer diameter smaller than that of the large-diameter portion 20q and larger than that of the small-diameter portion 20r so that the intermediate-diameter portion 20t does not overlap the bottom of the raceway 24h of the inner race 24g in the radial direction. The inner race 24g is secured to the nut 20 in such a manner as to abut against the intermediate-diameter portion 20t in the direction of the first reference axis L1.

Accordingly, it is possible to suppress deformation of the inner race 24g.

[Other Embodiments]

Although the present invention has been explained above based on the first to third embodiments, the specific structure of the present invention is not limited to the first to third embodiment, and changes in design or the like are included in the present invention without departing from the gist of the invention.

For example, although in the first to third embodiments the nut 20 is formed with the communication hole 41, the communication hole 41 need not always be formed.

Although the first to third embodiments show an example in which the belt 28 is used as a transmitting member transmitting the rotation of the input pulley 35 to the output pulley 27, the transmitting member is not limited to the belt 28 but may be a chain or the like.

Accordingly, the above-described embodiments make it possible to improve the yield as compared to a nut forming process in which the inner periphery of the nut is formed by cutting or the like.

The present invention may be constructed as follows.

(1) A power steering apparatus may comprise:

a wheel turning shaft (a rack) arranged to move in an axial direction in response to rotation of a steering wheel to steer a steered wheel;

a housing including a wheel turning shaft housing portion accommodating the wheel turning shaft movably in the axial direction, and a reduction mechanism housing portion disposed at an intermediate position in the axial direction of the wheel turning shaft housing portion so as to surround the wheel turning shaft;

a wheel turning shaft-side ball screw groove provided on the outer periphery of the wheel turning shaft in a spiral groove configuration;

a nut which is a rotary element provided in the reduction mechanism housing portion, the rotary element being formed annularly so as to surround the wheel turning shaft by a die forging process in which, when an axis of rotation of the rotary element is defined as a first reference axis, a die used for the die forging process is released in a direction along the direction of the first reference axis;

a bearing provided between the inner wall of the reduction mechanism housing portion and the nut in a radial direction radial to a central axis defined by the axis of rotation of the nut, the bearing configured to surround the nut to rotatably support the nut relative to the housing;

a nut-side ball screw groove provided on the inner periphery of the nut in a spiral groove configuration to configure a ball recirculation groove in combination with the wheel turning shaft-side ball screw groove;

a plurality of balls provided in the ball recirculation groove;

an output pulley abutting surface provided on the nut at a position closer to the ball recirculation groove than the bearing in the direction of the first reference axis, the output pulley abutting surface being formed by a surface substantially perpendicular to the first reference axis;

a circular cylindrical output pulley secured to the nut in a state where the output pulley is positioned relative to the nut in the direction of the first reference axis by abutting against the output pulley abutting surface, the output pulley overlapping a region of the ball recirculation groove where the plurality of balls recirculate but not overlapping the bearing in the direction of the first reference axis;

a circular cylindrical input pulley disposed such that a second reference axis defined by an axis of rotation of the input pulley is offset from the first reference axis in the radial direction;

a transmitting member (a belt, a chain, or the like) provided to extend over the output pulley and the input pulley to transmit rotation of the input pulley to the output pulley;

an electric motor arranged to rotationally drive the input pulley to rotationally drive the nut through the transmitting member and the output pulley, so that rotation of the nut is converted into axial motion of the wheel turning shaft, thereby applying steering force to the wheel turning shaft; and a recirculation member (a tube) provided to connect one end and other end of the ball recirculation groove so that the plurality of balls are recirculatable in either direction between the one end and other end of the ball recirculation groove.

According to this power steering apparatus, the nut is formed by die forging, and it is therefore possible to improve the material yield as compared to cutting or other similar process. In addition, because the nut is formed with the output pulley abutting surface, it is unnecessary to provide a member for axially positioning the output pulley separately from the nut. Further, because the output pulley is configured to overlap at least a part of the ball recirculation groove, the axial dimension of the apparatus can reduced.

(2) In the power steering apparatus as set forth in (1), the bearing may be a ball bearing comprising an inner race, an outer race, and a plurality of balls provided between the inner race and the outer race. The inner race may be a separate component from the nut.

Accordingly, a general-purpose ball bearing can be used as the bearing, and a cost reduction can be achieved.

(3) The power steering apparatus as set forth in (2) may be constructed as follows. The nut comprises a small-diameter portion provided closer to the bearing than the recirculation member in the direction of the first reference axis and smaller in outer diameter than a large-diameter portion where the recirculation member is provided. The nut further has an external thread groove formed on the outer periphery of the small-diameter portion. The output pulley and the inner race are secured to the nut by being clamped between a step formed between the large-diameter portion and small-diameter portion of the nut and a lock nut provided on the outer periphery of the small-diameter portion and threadably engaged with the external thread groove.

Accordingly, the output pulley and the inner race can share with each other a member for securing them to the nut.

(4) The power steering apparatus as set forth in (2) may be constructed as follows. The nut comprises a small-diameter portion provided closer to the bearing than the recirculation member in the direction of the first reference axis and smaller in outer diameter than a large-diameter portion where the recirculation member is provided. The nut further has an intermediate-diameter portion provided between the large-diameter portion and the small-diameter portion and having an outer diameter smaller than that of the large-diameter portion and larger than that of the small-diameter portion so that the intermediate-diameter portion does not overlap the bottom of the raceway of the inner race in the radial direction. The inner race is secured to the nut in such a manner as to abut against the intermediate-diameter portion in the direction of the first reference axis.

Accordingly, the load applied to the inner race when secured to the nut does not act directly on a portion (thin-wall portion) of the inner race radially outward of the bottom of the raceway, and it is therefore possible to suppress deformation of the inner race.

(5) The power steering apparatus as set forth in (2) may be constructed as follows. The nut comprises a small-diameter portion provided closer to the bearing than the recirculation member in the direction of the first reference axis and smaller in outer diameter than a large-diameter portion where the recirculation member is provided. The inner race is disposed on the outer periphery of the small-diameter portion. The nut-side ball screw groove is provided in a region not overlapping the small-diameter portion in the direction of the first reference axis.

Accordingly, there is no nut-side ball screw groove on the small-diameter portion, which is thinner in wall thickness than the large-diameter portion. It is therefore possible to suppress a reduction in mechanical strength of the small-diameter portion.

(6) The power steering apparatus as set forth in (2) may be constructed as follows. The nut comprises a small-diameter portion provided closer to the bearing than the recirculation member in the direction of the first reference axis and smaller in outer diameter than a large-diameter portion where the recirculation member is provided. The inner race is disposed on the outer periphery of the small-diameter portion. The large-diameter portion has an outer diameter uniform throughout the entire length thereof in the direction of the first reference axis.

Accordingly, it is possible to improve the manufacturability of the nut forming process using die forging.

(7) In the power steering apparatus as set forth in (1), the bearing may be a ball bearing comprising an inner race, an outer race, and a plurality of balls provided between the inner race and the outer race. The inner race may be formed integrally with the nut.

Accordingly, a member for securing the inner race becomes unnecessary.

(8) The power steering apparatus as set forth in (1) may be constructed as follows. The nut comprises a pair of ball recirculation holes each opening at one end thereof into the nut-side ball screw groove and at the other end thereof on the outer periphery of the nut. The recirculation member is provided to connect the pair of ball recirculation holes to each other. The nut is formed so that the recirculation member projects from the outer peripheral surface of the nut in the radial direction.

Accordingly, the wall thickness of the nut can be reduced by an amount corresponding to the extent to which the recirculation member projects from the outer peripheral surface of the nut in the radial direction, and it is possible to reduce the radial dimension and weight of the nut.

(9) The power steering apparatus as set forth in (1) may be constructed as follows. The nut comprises a pair of ball recirculation holes each opening at one end thereof into the nut-side ball screw groove and at the other end thereof on the outer periphery of the nut. The nut further comprises a U-groove provided on the outer periphery of the nut to open outward in the radial direction so as to connect the pair of ball recirculation holes to each other. The recirculation member is disposed so that at least a part of the recirculation member is accommodated in the U-groove, and to connect the pair of ball recirculation holes to each other. When a circular direction around the first reference axis is defined as a circumferential direction, the nut includes a recess at a position opposite to the U-groove in the circumferential direction.

The provision of the U-groove causes a weight reduction; however, the provision of the recess allows an improvement in weight balance in the circumferential direction of the nut.

(10) The power steering apparatus as set forth in (1) may be constructed as follows. The nut comprises a pair of ball recirculation holes each opening at one end thereof into the nut-side ball screw groove and at the other end thereof on the outer periphery of the nut. The nut further comprises a U-groove provided on the outer periphery of the nut to open outward in the radial direction so as to connect the pair of ball recirculation holes to each other. The recirculation member is disposed so that at least a part of the recirculation member is accommodated in the U-groove, and to connect the pair of ball recirculation holes to each other. The recirculation member is secured to the nut with a securing member disposed outside the recirculation member in the radial direction. The securing member extends in a direction perpendicular to the longitudinal direction of the recirculation member. A pair of securing parts is provided at the opposite sides of the recirculation member in the direction perpendicular to the longitudinal direction of the recirculation member to secure the securing member to the nut.

Accordingly, it is possible to reduce the dimension of the securing member in the direction of the first reference axis as compared to a structure in which the securing member is provided to extend in the direction of the first reference axis.

(11) A power steering apparatus may include: a wheel turning shaft (a rack) moving in an axial direction in response to rotation of a steering wheel to steer a steered wheel; a housing having a wheel turning shaft housing portion accommodating the wheel turning shaft movably in the axial direction, and a reduction mechanism housing portion disposed at an intermediate position in the axial direction of the wheel turning shaft housing portion so as to surround the wheel turning shaft; a wheel turning shaft-side ball screw groove provided on the outer periphery of the wheel turning shaft in a spiral groove configuration; a nut which is a rotary element provided in the reduction mechanism housing portion, the rotary element being formed annularly so as to surround the wheel turning shaft by a die forging process in which, when an axis of rotation of the rotary element is defined as a first reference axis, a die used for the die forging process is released in a direction along the direction of the first reference axis; a bearing provided between the inner wall of the reduction mechanism housing portion and the nut in a radial direction radial to a central axis defined by the axis of rotation of the nut, the bearing surrounding the nut to rotatably support the nut relative to the housing; a nut-side ball screw groove provided on the inner periphery of the nut in a spiral groove configuration only in a range where the outer diameter of the nut is uniform in the direction of the first reference axis, to constitute a ball recirculation groove in combination with the wheel turning shaft-side ball screw groove; a plurality of balls provided in the ball recirculation groove; a circular cylindrical output pulley secured to the nut; a circular cylindrical input pulley disposed such that a second reference axis defined by an axis of rotation of the input pulley is offset from the first reference axis in the radial direction; a transmitting member (a belt, a chain, or the like) extending over the output pulley and the input pulley to transmit rotation of the input pulley to the output pulley; an electric motor rotationally driving the input pulley to rotationally drive the nut through the transmitting member and the output pulley, so that rotation of the nut is converted into axial motion of the wheel turning shaft, thereby applying steering force to the wheel turning shaft; a pair of ball recirculation holes each provided in the nut to open at one end thereof into the nut-side ball screw groove and at the other end thereof on the outer periphery of the nut; and a recirculation member (a tube) connecting the pair of ball recirculation holes to each other so that the plurality of balls are recirculatable in either direction between one end and other end of the ball recirculation groove.

According to this power steering apparatus, the nut is formed by die forging, and it is therefore possible to improve the material yield as compared to cutting or other similar process. In addition, because the nut-side ball screw groove is provided on the inner periphery of the nut only in a range where the outer diameter of the nut is uniform, it is possible to suppress degradation of the balance of mechanical strength due to a variation in radial wall thickness of the nut. (If the nut-side ball screw groove is formed on the small-diameter portion, the mechanical strength of the portion provided with the nut-side ball screw groove becomes lower than that of the rest of the nut.)

(12) In the power steering apparatus as set forth in (11), the nut may be formed so that the recirculation member projects from the outer peripheral surface of the nut in the radial direction.

Accordingly, the wall thickness of the nut can be reduced by an amount corresponding to the extent to which the recirculation member projects from the outer peripheral surface of the nut in the radial direction, and it is possible to reduce the radial dimension and weight of the nut.

(13) In the power steering apparatus as set forth in (11), the bearing may be a ball bearing having an inner race, an outer race, and a plurality of balls provided between the inner race and the outer race. The inner race may be a separate component from the nut.

Accordingly, a general-purpose ball bearing can be used as the bearing, and a cost reduction can be achieved.

(14) The power steering apparatus as set forth in (13) may be constructed as follows. The nut has a small-diameter portion provided closer to the bearing than the recirculation member in the direction of the first reference axis and smaller in outer diameter than a large-diameter portion where the recirculation member is provided. The nut further has an external thread groove formed on the outer periphery of the small-diameter portion. The output pulley and the inner race are secured to the nut by being clamped between a step formed between the large-diameter portion and small-diameter portion of the nut and a lock nut provided on the outer periphery of the small-diameter portion and threadably engaged with the external thread groove.

Accordingly, the output pulley and the inner race can share with each other a member for securing them to the nut.

(15) The power steering apparatus as set forth in (13) may be constructed as follows. The nut has a small-diameter portion provided closer to the bearing than the recirculation member in the direction of the first reference axis and smaller in outer diameter than a large-diameter portion where the recirculation member is provided. The nut further has an intermediate-diameter portion provided between the large-diameter portion and the small-diameter portion and having an outer diameter smaller than that of the large-diameter portion and larger than that of the small-diameter portion so that the intermediate-diameter portion does not overlap the bottom of the raceway of the inner race in the radial direction. The inner race is secured to the nut in such a manner as to abut against the intermediate-diameter portion in the direction of the first reference axis.

Accordingly, the load applied to the inner race when secured to the nut does not act directly on a portion (thin-wall portion) of the inner race radially outward of the bottom of the raceway, and it is therefore possible to suppress deformation of the inner race.

(16) In the power steering apparatus as set forth in (11), the bearing may be a ball bearing having an inner race, an outer race, and a plurality of balls provided between the inner race and the outer race. The inner race may be formed integrally with the nut.

Accordingly, a member for securing the inner race becomes unnecessary.

(17) The power steering apparatus as set forth in (11) may be constructed as follows. The nut has a pair of ball recirculation holes each opening at one end thereof into the nut-side ball screw groove and at the other end thereof on the outer periphery of the nut. The nut further has a U-groove provided on the outer periphery of the nut to open outward in the radial direction so as to connect the pair of ball recirculation holes to each other. The recirculation member is disposed so that at least a part of the recirculation member is accommodated in the U-groove, and to connect the pair of ball recirculation holes to each other. When a circular direction around the first reference axis is defined as a circumferential direction, the nut has a recess at a position opposite to the U-groove in the circumferential direction.

The provision of the U-groove causes a weight reduction; however, the provision of the recess allows an improvement in weight balance in the circumferential direction of the nut.

(18) The power steering apparatus as set forth in (11) may be constructed as follows. The nut has a pair of ball recirculation holes each opening at one end thereof into the nut-side ball screw groove and at the other end thereof on the outer periphery of the nut. The nut further has a U-groove provided on the outer periphery of the nut to open outward in the radial direction so as to connect the pair of ball recirculation holes to each other. The recirculation member is disposed so that at least a part of the recirculation member is accommodated in the U-groove, and to connect the pair of ball recirculation holes to each other. The recirculation member is secured to the nut with a securing member disposed outside the recirculation member in the radial direction. The securing member extends in a direction perpendicular to the longitudinal direction of the recirculation member. A pair of securing parts is provided at the opposite sides of the recirculation member in the direction perpendicular to the longitudinal direction of the recirculation member to secure the securing member to the nut.

Accordingly, it is possible to reduce the dimension of the securing member in the direction of the first reference axis as compared to a structure in which the securing member is provided to extend in the direction of the first reference axis.

(19) In a method of manufacturing a power steering apparatus including: a wheel turning shaft (a rack) moving in an axial direction in response to rotation of a steering wheel to steer a steered wheel; a housing having a wheel turning shaft housing portion accommodating the wheel turning shaft movably in the axial direction, and a reduction mechanism housing portion disposed at an intermediate position in the axial direction of the wheel turning shaft housing portion so as to surround the wheel turning shaft; a wheel turning shaft-side ball screw groove provided on the outer periphery of the wheel turning shaft in a spiral groove configuration; a nut rotatably provided in the reduction mechanism housing portion, the nut being formed annularly so as to surround the wheel turning shaft; a bearing provided between the inner wall of the reduction mechanism housing portion and the nut in a radial direction radial to a central axis defined by an axis of rotation of the nut, the bearing surrounding the nut to rotatably support the nut relative to the housing; a nut-side ball screw groove provided on the inner periphery of the nut in a spiral groove configuration to constitute a ball recirculation groove in combination with the wheel turning shaft-side ball screw groove; a plurality of balls provided in the ball recirculation groove; an output pulley abutting surface provided on the nut at a position closer to the ball recirculation groove than the bearing in the direction of a first reference axis defined by the axis of rotation of the nut, the output pulley abutting surface being formed by a surface substantially perpendicular to the first reference axis; a circular cylindrical output pulley secured to the nut in a state where the output pulley has been positioned relative to the nut in the direction of the first reference axis by abutting against the output pulley abutting surface, the output pulley overlapping a region of the ball recirculation groove where the plurality of balls recirculate but not overlapping the bearing in the direction of the first reference axis; a circular cylindrical input pulley disposed such that a second reference axis defined by an axis of rotation of the input pulley is offset from the first reference axis in the radial direction; a transmitting member (a belt, a chain, or the like) extending over the output pulley and the input pulley to transmit rotation of the input pulley to the output pulley; an electric motor rotationally driving the input pulley to rotationally drive the nut through the transmitting member and the output pulley, so that rotation of the nut is converted into axial motion of the wheel turning shaft, thereby applying steering force to the wheel turning shaft; and a recirculation member (a tube) connecting one end and other end of the ball recirculation groove so that the plurality of balls are recirculatable in either direction between the one end and other end of the ball recirculation groove; the nut may be formed by a die forging process in which a die used for the die forging process is released in a direction along the direction of the first reference axis.

According to this power steering apparatus manufacturing method, the nut is formed by die forging, and it is therefore possible to improve the material yield as compared to cutting or other similar process. In addition, because the nut is formed with the output pulley abutting surface, it is unnecessary to provide a member for axially positioning the output pulley separately from the nut. Further, because the output pulley is configured to overlap at least a part of the ball recirculation groove, the axial dimension of the apparatus can be reduced.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2013-181812 filed on Sep. 3, 2013.

The entire disclosure of Japanese Patent Application No. 2013-181812 filed on Sep. 3, 2013 including specification, claims, drawings and summary are incorporated herein by reference in its entirety.

What is claimed is:
1. A power steering apparatus comprising:
a wheel turning shaft arranged to move in an axial direction in response to rotation of a steering wheel to steer a steered wheel;
a housing including a wheel turning shaft housing portion accommodating the wheel turning shaft movably in the axial direction, and a reduction mechanism housing portion disposed at an intermediate position in the axial direction of the wheel turning shaft housing portion so as to surround the wheel turning shaft;
a wheel turning shaft-side ball screw groove provided on an outer periphery of the wheel turning shaft in a spiral groove configuration;
a nut which is a rotary element provided in the reduction mechanism housing portion, the rotary element being formed annularly so as to surround the wheel turning shaft by a die forging process in which, when an axis of rotation of the rotary element is defined as a first reference axis, a die used for the die forging process is released in a direction along a direction of the first reference axis;
a bearing provided between an inner wall of the reduction mechanism housing portion and the nut in a radial direction radial to a central axis defined by the axis of rotation of the nut, the bearing configured to surround the nut to rotatably support the nut relative to the housing;
a nut-side ball screw groove provided on an inner periphery of the nut in a spiral groove configuration to configure a ball recirculation groove in combination with the wheel turning shaft-side ball screw groove;
a plurality of balls provided in the ball recirculation groove;
an output pulley abutting surface provided on the nut at a position closer to the ball recirculation groove than the bearing in the direction of the first reference axis, the output pulley abutting surface being formed by a surface substantially perpendicular to the first reference axis;
a circular cylindrical output pulley secured to the nut in a state where the output pulley is positioned relative to the nut in the direction of the first reference axis by abutting against the output pulley abutting surface, the output pulley overlapping a region of the ball recirculation groove where the plurality of balls recirculate but not overlapping the bearing in the direction of the first reference axis;
a circular cylindrical input pulley disposed such that a second reference axis defined by an axis of rotation of the input pulley is offset from the first reference axis in the radial direction;
a transmitting member provided to extend over the output pulley and the input pulley to transmit rotation of the input pulley to the output pulley;
an electric motor arranged to rotationally drive the input pulley to rotationally drive the nut through the transmitting member and the output pulley, so that rotation of the nut is converted into axial motion of the wheel turning shaft, thereby applying steering force to the wheel turning shaft; and a recirculation member provided to connect one end and other end of the ball recirculation groove so that the plurality of balls are recirculatable in either direction between the one end and other end of the ball recirculation groove.

2. The power steering apparatus of claim 1, wherein the bearing is a ball bearing comprising an inner race, an outer race, and a plurality of balls provided between the inner race and the outer race;

the inner race being a separate component from the nut.

3. The power steering apparatus of claim 2, wherein the nut comprises a small-diameter portion provided closer to the bearing than the recirculation member in the direction of the first reference axis and smaller in outer diameter than a large-diameter portion where the recirculation member is provided, and an external thread groove formed on an outer periphery of the small-diameter portion;

the output pulley and the inner race being secured to the nut by being clamped between a step formed between the large-diameter portion and small-diameter portion of the nut and a lock nut provided on the outer periphery of the small-diameter portion and threadably engaged with the external thread groove.

4. The power steering apparatus of claim 2, wherein the nut comprises a small-diameter portion provided closer to the bearing than the recirculation member in the direction of the first reference axis and smaller in outer diameter than a large-diameter portion where the recirculation member is provided, and an intermediate-diameter portion provided between the large-diameter portion and the small-diameter portion and having an outer diameter smaller than that of the large-diameter portion and larger than that of the small-diameter portion so that the intermediate-diameter portion does not overlap a bottom of a raceway of the inner race in the radial direction;

the inner race being secured to the nut in such a manner as to abut against the intermediate-diameter portion in the direction of the first reference axis.

5. The power steering apparatus of claim 2, wherein the nut comprises a small-diameter portion provided closer to the bearing than the recirculation member in the direction of the first reference axis and smaller in outer diameter than a large-diameter portion where the recirculation member is provided;

the inner race being disposed on an outer periphery of the small-diameter portion;

the nut-side ball screw groove being provided in a region not overlapping the small-diameter portion in the direction of the first reference axis.

6. The power steering apparatus of claim 2, wherein the nut comprises a small-diameter portion provided closer to the bearing than the recirculation member in the direction of the first reference axis and smaller in outer diameter than a large-diameter portion where the recirculation member is provided;

the inner race being disposed on an outer periphery of the small-diameter portion;

the large-diameter portion having an outer diameter uniform throughout an entire length thereof in the direction of the first reference axis.

7. The power steering apparatus of claim 1, wherein the bearing is a ball bearing comprising an inner race, an outer race, and a plurality of balls provided between the inner race and the outer race;

the inner race being formed integrally with the nut.

8. The power steering apparatus of claim 1, wherein the nut comprises a pair of ball recirculation holes each opening at one end thereof into the nut-side ball screw groove and at an other end thereof on an outer periphery of the nut;

the recirculation member being provided to connect the pair of ball recirculation holes to each other;

the nut being formed so that the recirculation member projects from an outer peripheral surface of the nut in the radial direction.

9. The power steering apparatus of claim 1, wherein the nut comprises a pair of ball recirculation holes each opening at one end thereof into the nut-side ball screw groove and at an other end thereof on an outer periphery of the nut, and a U-groove provided on the outer periphery of the nut to open outward in the radial direction so as to connect the pair of ball recirculation holes to each other;

the recirculation member being disposed so that at least a part of the recirculation member is accommodated in the U-groove, and to connect the pair of ball recirculation holes to each other;

the nut, when a circular direction around the first reference axis is defined as a circumferential direction, including a recess at a position opposite to the U-groove in the circumferential direction.

10. The power steering apparatus of claim 1, wherein the nut comprises a pair of ball recirculation holes each opening at one end thereof into the nut-side ball screw groove and at an other end thereof on an outer periphery of the nut, and a U-groove provided on the outer periphery of the nut to open outward in the radial direction so as to connect the pair of ball recirculation holes to each other;

the recirculation member being disposed so that at least a part of the recirculation member is accommodated in the U-groove, and to connect the pair of ball recirculation holes to each other, the recirculation member being secured to the nut with a securing member disposed outside the recirculation member in the radial direction;

the securing member configured to extend in a direction perpendicular to a longitudinal direction of the recirculation member;

the power steering apparatus further comprising:

a pair of securing parts provided at opposite sides of the recirculation member in the direction perpendicular to the longitudinal direction of the recirculation member to secure the securing member to the nut.

11. A power steering apparatus comprising:

a wheel turning shaft arranged to move in an axial direction in response to rotation of a steering wheel to steer a wheel to be steered;

a housing including a wheel turning shaft housing portion accommodating the wheel turning shaft movably in the axial direction, and a reduction mechanism housing portion disposed at an intermediate position in the axial direction of the wheel turning shaft housing portion so as to surround the wheel turning shaft;

a wheel turning shaft-side ball screw groove provided on an outer periphery of the wheel turning shaft in a spiral groove configuration;

a nut which is a rotary element provided in the reduction mechanism housing portion, the rotary element being formed annularly so as to surround the wheel turning shaft by a die forging process in which, when an axis of rotation of the rotary element is defined as a first reference axis, a die used for the die forging process is released in a direction along a direction of the first reference axis;

a bearing provided between an inner wall of the reduction mechanism housing portion and the nut in a radial direction radial to a central axis defined by the axis of rotation of the nut, the bearing configured to surround the nut to rotatably support the nut relative to the housing;

a nut-side ball screw groove provided on an inner periphery of the nut in a spiral groove configuration only in a range where an outer diameter of the nut is uniform in the direction of the first reference axis, to configure a ball recirculation groove in combination with the wheel turning shaft-side ball screw groove;

a plurality of balls provided in the ball recirculation groove;

a circular cylindrical output pulley secured to the nut;

a circular cylindrical input pulley disposed such that a second reference axis defined by an axis of rotation of the input pulley is offset from the first reference axis in the radial direction;

a transmitting member provided to extend over the output pulley and the input pulley to transmit rotation of the input pulley to the output pulley;

an electric motor arranged to rotationally drive the input pulley to rotationally drive the nut through the transmitting member and the output pulley, so that rotation of the nut is converted into axial motion of the wheel turning shaft, thereby applying steering force to the wheel turning shaft;

a pair of ball recirculation holes each provided in the nut to open at one end thereof into the nut-side ball screw groove and at an other end thereof on an outer periphery of the nut; and a recirculation member provided to connect the pair of ball recirculation holes to each other so that the plurality of balls are recirculatable in either direction between one end and other end of the ball recirculation groove.

12. The power steering apparatus of claim 11, wherein the nut is formed so that the recirculation member projects from an outer peripheral surface of the nut in the radial direction.

13. The power steering apparatus of claim 11, wherein the bearing is a ball bearing comprising an inner race, an outer race, and a plurality of balls provided between the inner race and the outer race;

the inner race being a separate component from the nut.

14. The power steering apparatus of claim 13, wherein the nut comprises a small-diameter portion provided closer to the bearing than the recirculation member in the direction of the first reference axis and smaller in outer diameter than a large-diameter portion where the recirculation member is provided, and an external thread groove formed on an outer periphery of the small-diameter portion;

the output pulley and the inner race being secured to the nut by being clamped between a step formed between the large-diameter portion and small-diameter portion of the nut and a lock nut provided on the outer periphery of the small-diameter portion and threadably engaged with the external thread groove.

15. The power steering apparatus of claim 13, wherein the nut comprises a small-diameter portion provided closer to the bearing than the recirculation member in the direction of the first reference axis and smaller in outer diameter than a large-diameter portion where the recirculation member is provided, and an intermediate-diameter portion provided between the large-diameter portion and the small-diameter portion and including an outer diameter smaller than that of the large-diameter portion and larger than that of the small-diameter portion so that the intermediate-diameter portion does not overlap a bottom of a raceway of the inner race in the radial direction;

the inner race being secured to the nut in such a manner as to abut against the intermediate-diameter portion in the direction of the first reference axis.

16. The power steering apparatus of claim 13, wherein the bearing is a ball bearing comprising an inner race, an outer race, and a plurality of balls provided between the inner race and the outer race;

the inner race being formed integrally with the nut.

17. The power steering apparatus of claim 11, wherein the nut comprises a pair of ball recirculation holes each opening at one end thereof into the nut-side ball screw groove and at an other end thereof on an outer periphery of the nut, and a U-groove provided on the outer periphery of the nut to open outward in the radial direction so as to connect the pair of ball recirculation holes to each other;

the recirculation member being disposed so that at least a part of the recirculation member is accommodated in the U-groove, and to connect the pair of ball recirculation holes to each other;

the nut, when a circular direction around the first reference axis is defined as a circumferential direction, including a recess at a position opposite to the U-groove in the circumferential direction.

18. The power steering apparatus of claim 11, wherein the nut comprises a pair of ball recirculation holes each opening at one end thereof into the nut-side ball screw groove and at an other end thereof on an outer periphery of the nut, and a U-groove provided on the outer periphery of the nut to open outward in the radial direction so as to connect the pair of ball recirculation holes to each other;

the recirculation member being disposed so that at least a part of the recirculation member is accommodated in the U-groove, and to connect the pair of ball recirculation holes to each other, the recirculation member being secured to the nut with a securing member disposed outside the recirculation member in the radial direction;

the securing member configured to extend in a direction perpendicular to a longitudinal direction of the recirculation member;

the power steering apparatus further comprising;

a pair of securing parts provided at opposite sides of the recirculation member in the direction perpendicular to the longitudinal direction of the recirculation member to secure the securing member to the nut.

* * * * *